United States Patent
Aoyagi et al.

(10) Patent No.: US 9,492,763 B2
(45) Date of Patent: Nov. 15, 2016

(54) METHOD FOR PRODUCING MICROPARTICLES HAVING CONTROLLED CRYSTALLITE DIAMETER

(75) Inventors: Shiho Aoyagi, Izumi (JP); Kaeko Araki, Izumi (JP); Masaki Maekawa, Izumi (JP); Jun Kuraki, Izumi (JP); Masakazu Enomura, Izumi (JP)

(73) Assignee: M. TECHNIQUE CO., LTD., Izumi-Shi (JP)

( * ) Notice: Subject to any disclaimer, the term of this patent is extended or adjusted under 35 U.S.C. 154(b) by 193 days.

(21) Appl. No.: 14/232,124

(22) PCT Filed: Jul. 5, 2012

(86) PCT No.: PCT/JP2012/067164
§ 371 (c)(1),
(2), (4) Date: Jan. 10, 2014

(87) PCT Pub. No.: WO2013/008706
PCT Pub. Date: Jan. 17, 2013

(65) Prior Publication Data
US 2014/0155247 A1    Jun. 5, 2014

(30) Foreign Application Priority Data

Jul. 13, 2011 (JP) .................................. 2011-155115

(51) Int. Cl.
*B01D 9/00*     (2006.01)
*C04B 35/626*   (2006.01)
(Continued)

(52) U.S. Cl.
CPC ............ *B01D 9/0063* (2013.01); *B01D 9/0054* (2013.01); *B01J 19/1887* (2013.01);
(Continued)

(58) Field of Classification Search
CPC ............ B01J 2219/00164; B01J 2219/00177; B01J 19/1887; C09B 67/0005; C04B 35/626; B01D 9/0063

USPC ............................................. 75/370; 501/134
See application file for complete search history.

(56) References Cited

U.S. PATENT DOCUMENTS

2010/0155310 A1    6/2010  Enomura
2010/0215958 A1*   8/2010  Enomura ............... A61K 9/146
                                               428/402
2010/0322997 A1*  12/2010  Enomura ............. A61K 9/0048
                                               424/444

FOREIGN PATENT DOCUMENTS

EP    2 191 890 A1    6/2010
EP    2 193 865 A1    6/2010
(Continued)

OTHER PUBLICATIONS

English translation of JP2006124787.*
(Continued)

*Primary Examiner* — Alison L Hindenlang
*Assistant Examiner* — Mohamed K Ahmed Ali
(74) *Attorney, Agent, or Firm* — Birch, Stewart, Kolasch & Birch, LLP

(57) ABSTRACT

At least two types of fluids to be processed are mixed in a thin film fluid formed between at least two processing surfaces which are approachably and separably disposed facing each other. At least one processing surface rotates relative to the other, and a substance to be separated giving a controlled crystallite diameter is caused to separate. Specific conditions related to a fluid to be processed are varied to control the crystallite diameter of the substance to be separated. The specific conditions are the type of substance to be separated; the concentration of the substance to be separated included in the raw material fluid and/or substance included in the separating fluid; the pH of the raw material fluid and/or separating material fluid; the introduction temperature of the raw material fluid and/or separating fluid; and the introduction velocity of the raw material fluid and/or separating fluid.

2 Claims, 9 Drawing Sheets

(51) Int. Cl.
*C22B 15/00* (2006.01)
*B01J 19/18* (2006.01)

(52) U.S. Cl.
CPC ......... *C04B35/626* (2013.01); *C22B 15/0089* (2013.01); *B01J 2219/00085* (2013.01); *B01J 2219/00164* (2013.01); *B01J 2219/00177* (2013.01)

(56) References Cited

FOREIGN PATENT DOCUMENTS

| JP | 6-262061 A | 9/1994 |
|---|---|---|
| JP | 2004-115287 A | 4/2004 |
| JP | 2006-124787 A | 5/2006 |
| JP | 2008-30966 A | 2/2008 |
| JP | 2008-289985 A | 12/2008 |
| JP | 2009-82902 A | 4/2009 |
| JP | 2010-24478 A | 2/2010 |
| JP | 2010-201344 A | 9/2010 |
| JP | 2011-11956 A | 1/2011 |
| JP | 2011-80094 A | 4/2011 |

OTHER PUBLICATIONS

Sun, "Production Method of Nano Material and Its Application," First Edition, China Textile & Apparel Press, Sep. 2012, 5 pages, along with partial Englsih translation.

* cited by examiner (A)

(B)

(A)

(B)

METHOD FOR PRODUCING MICROPARTICLES HAVING CONTROLLED CRYSTALLITE DIAMETER

The present invention relates to a method for producing microparticles having controlled crystallite diameter.

BACKGROUND ART

In recent years, microparticles are used widely in various industrial fields such as optical materials, magnetic materials, electrical conductive materials, electronic materials, functional ceramics, fluorescent materials, catalyst materials, chemical material, and so forth. In accordance with the increasing requirements in goods for multifunction, miniaturization, and the like, problems to be solved is to stuff functions thereinto as much as possible, and in addition, to reduce the size and the weight thereof further down than now; and in order to fulfill these needs, microparticles are considered to be indispensable. In addition, by making microparticles, the particles may acquire new physical properties such as enhanced activity and transparency. However, for example, in the case of barium titanate or the like that is used for a derivative thin film, it is known that there is a close relationship between the crystallite diameter and the characteristics of microparticles, as shown by the example that an intended physical properties cannot be obtained if the crystallite diameter in the microparticles becomes too small. Accordingly, it is considered that microparticles need to be control not only in the particle diameter thereof but also in the crystallite diameter thereof.

Generally, the crystallite means the maximum congregate that can be considered to be a single crystal; and the size of this crystallite is called as the crystallite diameter. To measure the crystallite diameter, there are a method that lattice fringe of the crystallite is confirmed by using an electron microscope and a method that the crystallite diameter is calculated from the diffraction pattern obtained by using an X-ray diffraction apparatus and the Scherrer equation.

Crystallite diameter $D = K \times \lambda / (\beta \times \cos \theta)$     Scherrer equation Here, for calculation, K, the Scherrer's constant, is K=0.9; $\lambda$ is the wavelength of the X-ray tube used; $\beta$ is the half-width; and $\theta$ is the diffraction angle.

Illustrative example of the method for controlling the crystallite diameter of microparticles includes: a method wherein a metal single body, a metal ion, a metal compound, or a metal solution having these entities dissolved in a solvent is treated by the solvothermal method as shown in Patent Document 1; and a method wherein a hydrothermal treatment is conducted under a subcritical or a supercritical condition, or a heat treatment is conducted under an inert atmosphere, as shown in Patent Documents 2 to 4. In these methods, an apparatus having superior heat resistance and pressure resistance as well as an inert atmospheric condition is required, and moreover time is necessary for these treatments; and thus, there are problems of increase in an energy cost and so forth.

The applicant of the present invention provided the method for producing microparticles shown in Patent Document 5, in which control of the particle diameter was disclosed; however, there has been no disclosure as to a method for controlling the crystallite diameter.

PRIOR ART DOCUMENTS

Patent Document
Patent document 1: Japanese Patent Laid-Open Publication No. 2008-30966
Patent document 2: Japanese Patent Laid-Open Publication No. 2008-289985
Patent document 3: Japanese Patent Laid-Open Publication No. 2010-24478
Patent document 4: Japanese Patent Laid-Open Publication No. 2011-11956
Patent document 5: Japanese Patent Laid-Open Publication No. 2010-201344

In view of the situation mentioned above, the present invention has an object to provide a method for producing microparticles having controlled crystallite diameter.

Inventors of the present invention carried out an extensive investigation, and as a result of it, they found that, on the occasion to separate a microparticle of substance to be separated by mixing as fluids to be processed a raw material fluid containing at least one substance to be separated with a separating fluid containing at least one substance to separate the substance to be separated between two processing surfaces which are disposed in a position they are faced with each other so as to be able to approach to and separate from each other, at least one of which rotates relative to the other, a microparticle of substance to be separated having a controlled crystallite diameter can be obtained by changing a specific condition with regard to at least any one of the raw material fluid and the separating fluid; and based on this finding, the present invention could be accomplished.

The present application provides a method for producing a microparticle, wherein at least two fluids to be processed are used, of these at least one fluid to be processed is a raw material fluid containing at least one substance to be separated, and at least one fluid to be processed other than the foregoing fluid to be processed is a separating fluid containing at least one substance to separate the substance to be separated;

these fluids to be processed are mixed in a thin film fluid formed between at least two processing surfaces which are disposed in a position they are faced with each other so as to be able to approach to and separate from each other, at least one of which rotates relative to the other, thereby separating the substance to be separated having a crystallite diameter thereof controlled;

the crystallite diameter of the substance to be separated is controlled by changing specific conditions with regard to at least any one of the raw material fluid and the separating fluid that are introduced into between the at least two processing surfaces;

the said specific conditions being at least two conditions selected from the group consisting of:

kind of at least any one of at least one substance to be separated contained in the raw material fluid and at least one substance contained in the separating fluid, concentration of at least any one of at least one substance to be separated contained in the raw material fluid and at least one substance contained in the separating fluid, pH of at least any one of the raw material fluid and the separating fluid, introduction temperature of at least any one of the raw material fluid and the separating fluid, and introduction velocity of at least any one of the raw material fluid and the separating fluid.

As for the foregoing change of the specific conditions with regard to at least any one of the raw material fluid and the separating fluid that are introduced into between at least two processing surfaces, there may be specifically mentioned the following: (A) to control kind of the substance to be separated contained in the raw material fluid and/or of the substance contained in the separating fluid to separate the substance to be separated, (B) to control concentration of the substance to be separated contained in the raw material fluid and/or of the substance contained in the separating fluid to separate the substance to be separated, (C) to control pH of the raw material fluid and/or of the separating fluid, (D) to control introduction temperature of the raw material fluid and/or of the separating fluid, and (E) to control introduction velocity of the raw material fluid and/or of the separating fluid; and as to the respective controls, the following (1) to (15) may be mentioned. The control may be done by combining at least two controls selected from (1) to (15).

(A) Control of kind of the substance to be separated contained in the raw material fluid and/or of the substance contained in the separating fluid to separate the substance to be separated may be done as following.

(1) The kind of the substance to be separated contained in at least one raw material fluid is changed.

(2) The kind of the substance contained in at least one separating fluid to separate the substance to be separated is changed.

(3) The kind of the substance to be separated contained in at least one raw material fluid and the kind of the substance contained in at least one separating fluid to separate the substance to be separated are both changed.

(B) Control of concentration of the substance to be separated contained in the raw material fluid and/or of the substance contained in the separating fluid to separate the substance to be separated may be done as following.

(4) The concentration of the substance to be separated contained in at least one raw material fluid is changed.

(5) The concentration of the substance contained in the separating fluid to separate the substance to be separated is changed.

(6) The concentration of the substance to be separated contained in at least one raw material fluid and the concentration of the substance contained in at least one separating fluid to separate the substance to be separated are both changed.

(C) Control of pH of the raw material fluid and/or of the separating fluid may be done as following.

(7) The pH of at least one raw material fluid is changed.

(8) The pH of at least one separating fluid is changed.

(9) The pH of at least one raw material fluid and the pH of at least one separating fluid are both changed.

(D) Control of introduction temperature of the raw material fluid and/or of the separating fluid may be done as following.

(10) The introduction temperature of at least one raw material fluid is changed.

(11) The introduction temperature of at least one separating fluid is changed.

(12) The introduction temperature of at least one raw material fluid and the introduction temperature of at least one separating fluid are both changed.

(E) Control of introduction velocity of the raw material fluid and/or of the separating fluid may be done as following.

(13) The introduction velocity of at least one raw material fluid is changed.

(14) The introduction velocity of at least one separating fluid is changed.

(15) The introduction velocities of at least one raw material fluid and the introduction velocity of at least one separating fluid are both changed.

In addition, the present invention may be carried out in the way that only the crystallite diameter of the substance to be separated is changed without changing the particle diameter of the substance to be separated.

In addition, the present invention may be carried out in the way that both the particle diameter of the substance to be separated and the crystallite diameter of the substance to be separated are changed.

In addition, the present invention may be carried out in the way that at least two fluids to be processed are used, of these at least one fluid to be processed is a raw material fluid containing at least one substance to be separated, and at least one fluid to be processed other than the foregoing fluid to be processed is a separating fluid containing at least one substance to separate the substance to be separated;

these fluids to be processed are mixed in a thin film fluid formed between at least two processing surfaces which are disposed in a position they are faced with each other so as to be able to approach to and separate from each other, at least one of which rotates relative to the other, thereby separating the substance to be separated having a crystallite diameter thereof controlled;

the crystallite diameter of the substance to be separated is controlled by changing a specific condition with regard to at least any one of the raw material fluid and the separating fluid that are introduced into between the at least two processing surfaces;

the said specific condition being at least one condition selected from the group consisting of:

pH of at least anyone of the raw material fluid and the separating fluid, introduction temperature of at least any one of the raw material fluid and the separating fluid, and introduction velocity of at least any one of the raw material fluid and the separating fluid.

According to mere one embodiment of the present invention, the present invention may be carried out as a method for producing a microparticle, wherein the method comprises:

a fluid pressure imparting mechanism for imparting a pressure to a fluid to be processed, a first processing member provided with a first processing surface of the at least two processing surfaces, a second processing member provided with a second processing surface of the at least two processing surfaces, and a rotation drive mechanism for rotating these processing members relative to each other; wherein each of the processing surfaces constitutes part of a sealed flow path through which the fluid to be processed under the pressure is passed, of the first and the second processing members, at least the second processing member is provided with a pressure-receiving surface, and at least part of this pressure-receiving surface is comprised of the second processing surface, the pressure-receiving surface receives a pressure applied to the fluid to be processed by the fluid pressure imparting mechanism thereby generating a force to move in the direction of separating the second processing surface from the first processing surface, the fluid to be processed under the pressure is passed between the first processing surface and the second processing surface which are disposed in a position they are faced with each other so as to be able to approach to and separate from each other, at least one of which rotates relative to the other, whereby the fluid to be processed forms a thin film fluid, and a substance to be separated having a controlled crystallite diameter is separated in this thin film fluid.

According to mere another embodiment of the present invention, the present invention may be carried out as a method for producing a microparticle, wherein at least one fluid of the fluids to be processed passes through between both the processing surfaces while forming the thin film fluid, an another introduction path independent of the flow path for the foregoing at least one fluid is provided, at least one opening leading to this introduction path is arranged in at least any one of the first processing surface and the second processing surface, at least one fluid which is different from the foregoing at least one fluid is introduced into between the processing surfaces through this opening, the fluids to be processed are mixed in the thin film fluid, and a substance to be separated having a crystallite diameter thereof controlled is separated in this thin film fluid.

Advantages

The present invention made it possible to control the crystallite diameter of microparticles as well as to simply and continuously produce microparticles having the controlled crystallite diameter, both of them having been difficult by conventional production methods. In addition, because it became possible to control the crystallite diameter of obtained microparticles by simple change of their treatment conditions like changing a specific condition, it became possible to selectively produce microparticles having different crystallite diameters with lower cost and energy than ever; and thus, the intended microparticles of crystallite diameter can be provided cheaply and stably. In addition, in the present invention, both the particle diameter and the crystallite diameter of the microparticle can be changed simultaneously, or only the crystallite diameter may be changed without changing the particle diameter; and thus, it is possible to furnish the microparticle having a desired particle diameter with intended properties.

Figure 1:
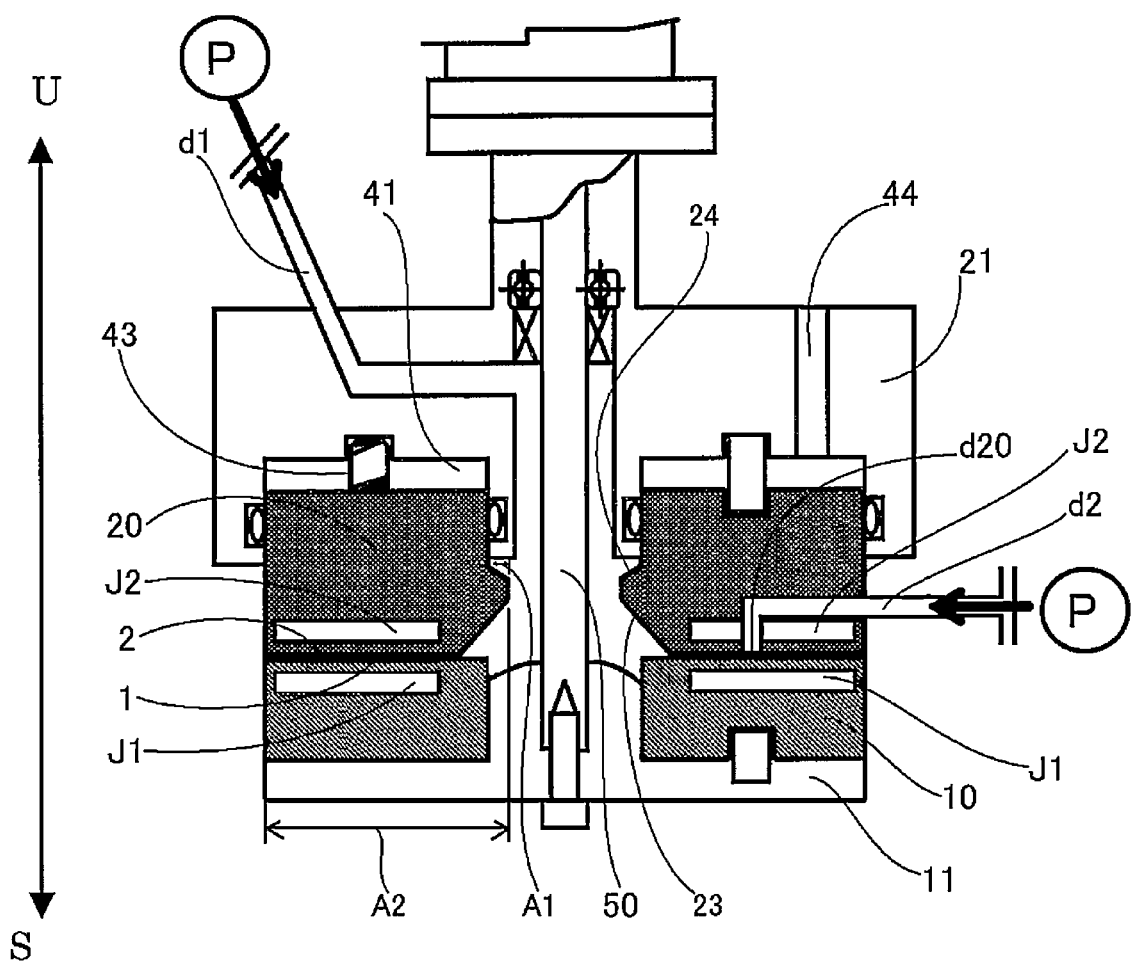
FIG. 1 is a schematic sectional view showing the fluid processing apparatus according to an embodiment of the present invention.

Hereunder, one embodiment of the present invention will be specifically explained.

The raw material fluid in the present invention is the one having a substance to be separated, i.e., a raw material, mixed with or dissolved into a later-mentioned solvent (hereinafter, this is simply described as dissolution).

The substance to be separated in the present invention is not particularly restricted, while illustrative example thereof includes an organic substance, an inorganic substance, an organic-inorganic composite material, and the like; such as a single body of a metal element and of a non-metal element, a compound of these elements, and the like. Illustrative example of the said compound includes a salt, an oxide, a hydroxide, a hydroxylated oxide, a nitride, a carbide, a complex, an organic compound, a hydrate of these substances, and an organic solvent adduct of these substances. These may be a single substance to be separated or may be a mixture of two or more of them.

Meanwhile, the substance to be separated may be in the same state or in the different state between the substance to be separated that is used as the starting raw material and the substance to be separated that is separated by mixing with the later-mentioned separating fluid. For example, the substance to be separated that is used as the starting raw material may be a metal compound while the substance to be separated that is separated by mixing it with the later-mentioned separating fluid may be a metal single body that constitutes the foregoing metal compound; or the substance to be separated that is used as the starting raw material may be a mixture of plural metal compounds while the substance to be separated that is separated by mixing it with the later-mentioned separating fluid may be a reaction product of the reaction between the mixture of plural metal compounds that are substances to be separated used as the starting raw material and the substance contained in the separating fluid to separate the substance to be separated. Furthermore, the substance to be separated that is used as the starting raw material may be a metal single body while the substance to be separated that is separated by mixing it with the later-mentioned separating fluid may be the same metal single body.

The separating fluid in the present invention shall contain at least one substance to separate the substance to be separated. As to the separating fluid, a later-mentioned solvent may be used solely or may contain following substances in the solvent as the substance to separate the substance to be separated. The said substance is not particularly restricted, while illustrative example thereof includes inorganic or organic acidic substances such as hydrochloric acid, sulfuric acid, nitric acid, aqua regia, trichloroacetic acid, trifluoroacetic acid, phosphoric acid, citric acid, and ascorbic acid; basic substances such as alkaline hydroxides including sodium hydroxide and potassium hydroxide, and amines including triethylamine and dimethylamino ethanol; and salts of these acidic substances and basic substances. In addition, a reducing agent that can reduce the afore-mentioned substances to be separated, for example, a reducing agent capable of reducing a metal and/or a metal compound, preferably a metal ion, contained in the metal solution may be mentioned. The reducing agent is not particularly restricted; though a substance capable of reducing a metal ion is preferable. Illustrative example thereof includes hydrazine, hydrazine monohydrate, formaldehyde, sodium sulfoxylate, a boron hydride metal salt, an aluminum hydride metal salt, a triethylboron hydride metal salt, glucose, citric acid, ascorbic acid, tannic acid, dimethylformamide, pyrogallol, tetrabutylammonium borohydride, sodium hypophosphite ($NaH_2PO_2 \cdot H_2O$), Rongalite C ($NaHSO_2 \cdot CH_2O \cdot 2H_2O$), and a metal compound or an ion thereof, preferably a transition metal or an ion thereof, such as iron and titanium. The foregoing reducing agents include those in the form of a hydrate, an organic solvent adduct, and an anhydrous compound thereof. These substances to separate a substance to be separated each may be used singly or as a mixture of two or more of them. Meanwhile, in the case that the afore-mentioned solvent is used as the separating fluid, the afore-mentioned solvent becomes the substance to separate the substance to be separated.

Solvents:

The solvent to be used for a raw material fluid and separating fluid in the present invention is not particularly restricted; and illustrative example thereof includes water such as an ion-exchanged water, a RO water, a pure water, and a ultrapure water; alcoholic organic solvents such as methanol and ethanol; polyol organic solvents (polyvalent alcohols) such as ethylene glycol, propylene glycol, trimethylene glycol, triethylene glycol, polyethylene glycol, and glycerin; ketonic organic solvents such as acetone and methyl ethyl ketone; ester organic solvents such as ethyl acetate and butyl acetate; ether organic solvents such as dimethyl ether and dibutyl ether; aromatic organic solvents such as benzene, toluene, and xylene; and aliphatic hydrocarbon organic solvents such as hexane and pentane. If the foregoing alcoholic organic solvents or polyol organic solvents are used as the solvent, there is a merit that these solvents can act also as the reducing agent. These solvents each may be used singly or as a mixture of two or more of them. Especially, as to the separating fluid, the above-mentioned solvent may be used solely as the separating fluid, as mentioned above. In other words, the above-mentioned solvent may become the substance to separate the substance to be separated even as it is used solely.

The raw material fluid and/or the separating fluid in the present invention may be used even if these include the state such as a dispersion solution and a slurry of them.

Fluid Processing Apparatus:

In the present invention, it is preferable that mixing of the raw material fluid containing at least one substance to be processed with the separating fluid containing at least one substance to separate the substance to be separated is contained be done by stirring and mixing in a thin film fluid formed between at least two processing surfaces which are disposed in a position they are faced with each other so as to be able to approach to and separate from each other, at least one of which rotates relative to the other; and thus, for example, it is preferable that the microparticle be separated by mixing by using an apparatus based on the same principle as the apparatus shown in the Patent Document 5 filed by the present applicant. By using the apparatus based on the principle like this, the microparticle having controlled crystallite diameter uniformly and homogeneously can be produced.

Hereinafter, embodiments of the above-mentioned fluid processing apparatus will be explained by using the drawings.

Figure 2:
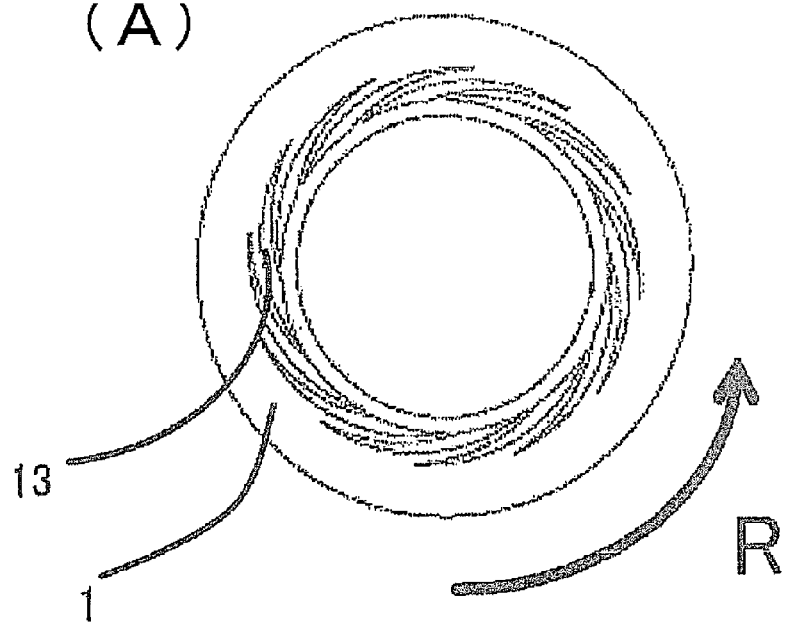
FIG. 2(A) is a schematic plane view of the first processing surface in the fluid processing apparatus shown in FIG. 1.
FIG. 2(B) is an enlarged view showing an important part of the processing surface in the apparatus.
Figure 2:
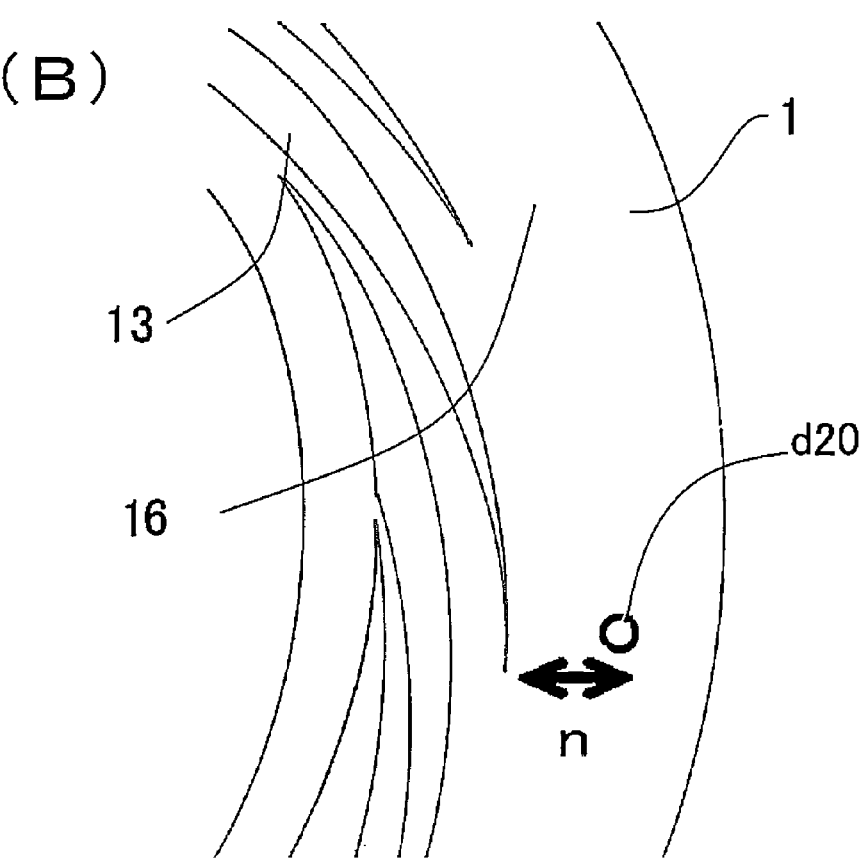
Figure 3:
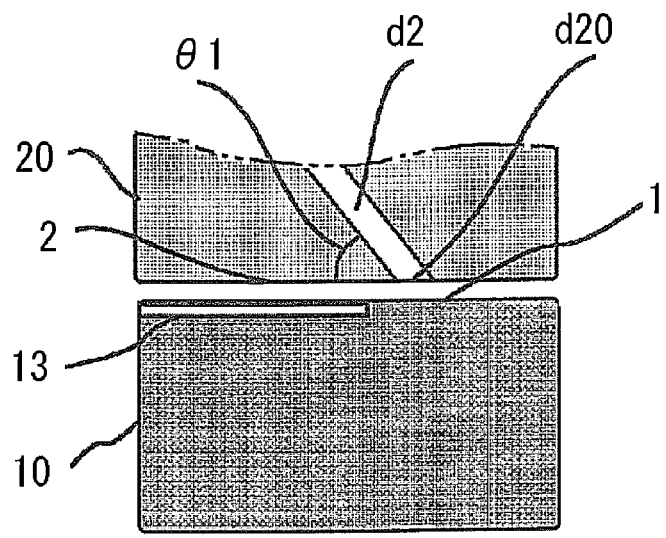
FIG. 3(A) is a sectional view of the second introduction member of the apparatus.
FIG. 3(B) is an enlarged view showing an important part of the processing surface for explaining the second introduction member.
Figure 3:
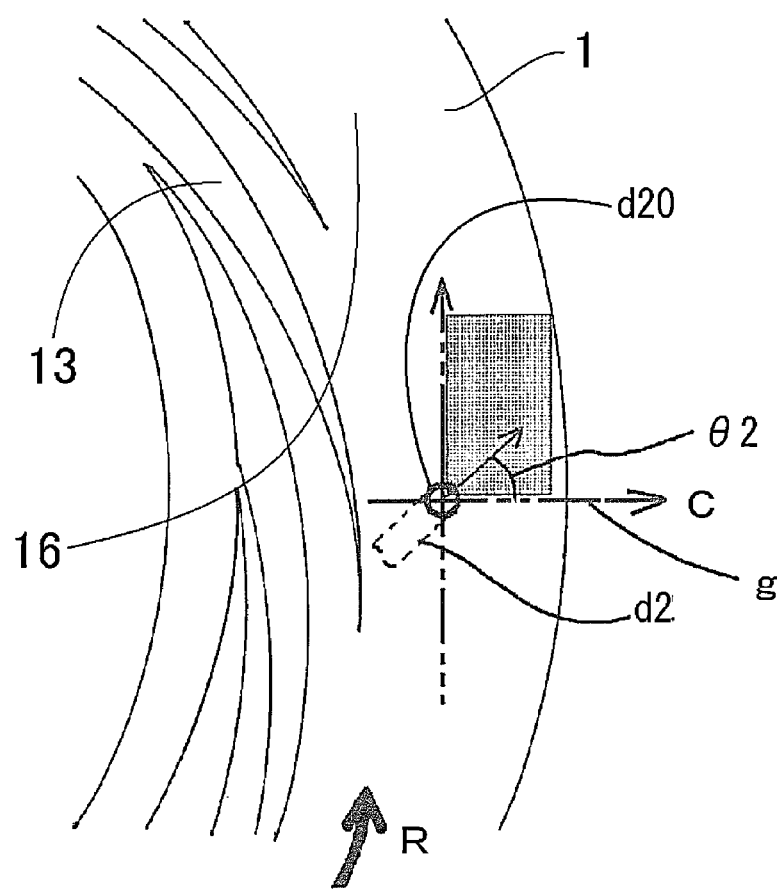

The fluid processing apparatus shown in FIG. 1 to FIG. 3 is similar to the apparatus described in Patent Document 5, with which a material to be processed is processed between processing surfaces in processing members arranged so as to be able to approach to and separate from each other, at least one of which rotates relative to the other; wherein, of the fluids to be processed, a first fluid to be processed, i.e., a first fluid, is introduced into between the processing surfaces, and a second fluid to be processed, i.e., a second fluid, is introduced into between the processing surfaces from a separate path that is independent of the flow path introducing the first fluid and has an opening leading to between the processing surfaces, whereby the first fluid and the second fluid are mixed and stirred between the processing surfaces. Meanwhile, in FIG. 1, a reference character U indicates an upside and a reference character S indicates a downside; however, up and down, front and back and right and left shown therein indicate merely a relative positional relationship and does not indicate an absolute position. In FIG. 2(A) and FIG. 3(B), reference character R indicates a rotational direction. In FIG. 3(C), reference character C indicates a direction of centrifugal force (a radial direction).

In this apparatus provided with processing surfaces arranged opposite to each other so as to be able to approach to and separate from each other, at least one of which rotates relative to the other, at least two kinds of fluids as fluids to be processed are used, wherein at least one fluid thereof contains at least one kind of material to be processed, a thin film fluid is formed by converging the respective fluids between these processing surfaces, and the material to be processed is processed in this thin film fluid. With this apparatus, a plurality of fluids to be processed may be processed as mentioned above; but a single fluid to be processed may be processed as well.

This fluid processing apparatus is provided with two processing members of a first processing member 10 and a second processing member 20 arranged opposite to each other, wherein at least one of these processing members rotates. The surfaces arranged opposite to each other of the respective processing members 10 and 20 are made to be the respective processing surfaces. The first processing member 10 is provided with a first processing surface 1 and the second processing member 20 is provided with a second processing surface 2.

The processing surfaces 1 and 2 are connected to a flow path of the fluid to be processed and constitute part of the flow path of the fluid to be processed. Distance between these processing surfaces 1 and 2 can be changed as appropriate; and thus, the distance thereof is controlled so as to form a minute space usually in the range of 1 mm or less, for example, 0.1 □m to 50 □m. With this, the fluid to be processed passing through between the processing surfaces 1 and 2 becomes a forced thin film fluid forced by the processing surfaces 1 and 2.

When a plurality of fluids to be processed are processed by using this apparatus, the apparatus is connected to a flow path of the first fluid to be processed whereby forming part of the flow path of the first fluid to be processed; and part of the flow path of the second fluid to be processed other than the first fluid to be processed is formed. In this apparatus, the two paths converge into one, and two fluids to be processed are mixed between the processing surfaces 1 and 2 so that the fluids may be processed by reaction and so on. It is noted here that the term "process(ing)" includes not only the embodiment wherein a material to be processed is reacted but also the embodiment wherein a material to be processed is only mixed or dispersed without accompanying reaction.

To specifically explain, this apparatus is provided with a first holder 11 for holding the first processing member 10, a second holder 21 for holding the second processing member 20, a surface-approaching pressure imparting mechanism, a rotation drive mechanism, a first introduction part d1, a second introduction part d2, and a fluid pressure imparting mechanism p.

As shown in FIG. 2(A), in this embodiment, the first processing member 10 is a circular body, specifically a disk with a ring form. Similarly, the second processing member 20 is a circular disk. Material of the processing members 10 and 20 is not only metal and carbon but also ceramics, sintered metal, abrasion-resistant steel, sapphire, and other metal subjected to hardening treatment, and rigid material subjected to lining, coating, or plating. In the processing members 10 and 20 of this embodiment, at least part of the first and the second surfaces 1 and 2 arranged opposite to each other is mirror-polished.

Roughness of this mirror polished surface is not particularly limited; but surface roughness Ra is preferably 0.01 µm to 1.0 µm, or more preferably 0.03 µm to 0.3 µm.

At least one of the holders can rotate relative to the other holder by a rotation drive mechanism such as an electric motor (not shown in drawings). A reference numeral 50 in FIG. 1 indicates a rotary shaft of the rotation drive mechanism; in this embodiment, the first holder 11 attached to this rotary shaft 50 rotates, and thereby the first processing member 10 attached to this first holder 11 rotates relative to the second processing member 20. As a matter of course, the second processing member 20 may be made to rotate, or the both may be made to rotate. Further in this embodiment, the first and second holders 11 and 21 may be fixed, while the first and second processing members 10 and 20 may be made to rotate relative to the first and second holders 11 and 21.

At least any one of the first processing member 10 and the second processing member 20 is able to approach to and separate from at least any other member, thereby the processing surfaces 1 and 2 are able to approach to and separate from each other.

In this embodiment, the second processing member 20 approaches to and separates from the first processing member 10, wherein the second processing member 20 is accepted in an accepting part 41 arranged in the second holder 21 so as to be able to rise and set. However, as opposed to the above, the first processing member 10 may approach to and separate from the second processing member 20, or both the processing members 10 and 20 may approach to and separate from each other.

This accepting part 41 is a concave portion for mainly accepting that side of the second processing member 20 opposite to the second processing surface 2, and this concave portion is a groove being formed into a circle, i.e., a ring when viewed in a plane. This accepting part 41 accepts the second processing member 20 with sufficient clearance so that the second processing member 20 may rotate. Meanwhile, the second processing member 20 may be arranged so as to be movable only parallel to the axial direction; alternatively, the second processing member 20 may be made movable, by making this clearance larger, relative to the accepting part 41 so as to make the center line of the processing member 20 inclined, namely unparallel, to the axial direction of the accepting part 41, or movable so as to depart the center line of the processing member 20 and the center line of the accepting part 41 toward the radius direction.

It is preferable that the second processing member 20 be accepted by a floating mechanism so as to be movable in the three dimensional direction, as described above.

The fluids to be processed are introduced into between the processing surfaces 1 and 2 from the first introduction part d1 and the second introduction part d2, the flow paths through which the fluids flow, under the state that pressure is applied thereto by a fluid pressure imparting mechanism p consisting of various pumps, potential energy, and so on. In this embodiment, the first introduction part d1 is a path arranged in the center of the circular, second holder 21, and one end thereof is introduced into between the processing surfaces 1 and 2 from inside the circular, processing members 10 and 20. Through the second introduction part d2, the first fluid to be processed and the second fluid to be processed for reaction are introduced into between the processing surfaces 1 and 2. In this embodiment, the second introduction part d2 is a path arranged inside the second processing member 20, and one end thereof is open at the second processing surface 2. The first fluid to be processed which is pressurized with the fluid pressure imparting mechanism p is introduced from the first introduction part d1 to the space inside the processing members 10 and 20 so as to pass through between the first and processing surfaces 1 and 2 to outside the processing members 10 and 20. From the second introduction part d2, the second fluid to be processed which is pressurized with the fluid pressure imparting mechanism p is provided into between the processing surfaces 1 and 2, whereat this fluid is converged with the first fluid to be processed, and there, various fluid processing such as mixing, stirring, emulsification, dispersion, reaction, deposition, crystallization, and separation are effected, and then the fluid thus processed is discharged from the processing surfaces 1 and 2 to outside the processing members 10 and 20. Meanwhile, an environment outside the processing members 10 and 20 may be made negative pressure by a vacuum pump.

The surface-approaching pressure imparting mechanism mentioned above supplies the processing members with force exerting in the direction of approaching the first processing surface 1 and the second processing surface 2 each other. In this embodiment, the surface-approaching pressure imparting mechanism is arranged in the second holder 21 and biases the second processing member 20 toward the first processing member 10.

The surface-approaching pressure imparting mechanism is a mechanism to generate force (hereinafter, surface-approaching pressure) to press the first processing surface 1 of the first processing member 10 and the second processing surface 2 of the second processing member 20 in the direction to make them approach to each other. The mechanism generates a thin film fluid having minute thickness in a level of nanometer or micrometer by the balance between the surface-approaching pressure and the force to separate the processing surfaces 1 and 2 from each other, i.e., the force such as the fluid pressure. In other words, the distance between the processing surfaces 1 and 2 is kept in a predetermined minute distance by the balance between these forces.

In the embodiment shown in FIG. 1, the surface-approaching pressure imparting mechanism is arranged between the accepting part 41 and the second processing member 20. Specifically, the surface-approaching pressure imparting mechanism is composed of a spring 43 to bias the second processing member 20 toward the first processing member 10 and a biasing-fluid introduction part 44 to introduce a biasing fluid such as air and oil, wherein the surface-approaching pressure is provided by the spring 43 and the fluid pressure of the biasing fluid. The surface-approaching pressure may be provided by any one of this spring 43 and the fluid pressure of this biasing fluid; and other forces such as magnetic force and gravitation may also be used. The second processing member 20 recedes from the first processing member 10 thereby making a minute space between the processing surfaces by separating force, caused by viscosity and the pressure of the fluid to be processed applied by the fluid pressure imparting mechanism p, against the bias of this surface-approaching pressure imparting mechanism. By this balance between the surface-approaching pressure and the separating force as mentioned above, the first processing surface 1 and the second processing surface 2 can be set with the precision of a micrometer level; and thus the minute space between the processing surfaces 1 and 2 may be set. The separating force mentioned above includes fluid pressure and viscosity of the fluid to be processed, centrifugal force by rotation of the processing members, negative pressure when negative pressure is applied to the biasing-fluid introduction part 44, and spring force when the spring 43 works as a pulling spring. This surface-approaching pressure imparting mechanism may be arranged also in the first processing member 10, in place of the second processing member 20, or in both the processing members.

To specifically explain the separation force, the second processing member 20 has the second processing surface 2 and a separation controlling surface 23 which is positioned inside the processing surface 2 (namely at the entering side of the fluid to be processed into between the first and second processing surfaces 1 and 2) and next to the second processing surface 2. In this embodiment, the separation controlling surface 23 is an inclined plane, but may be a horizontal plane. The pressure of the fluid to be processed acts to the separation controlling surface 23 to generate force directing to separate the second processing member 20 from the first processing member 10. Therefore, the second processing surface 2 and the separation controlling surface 23 constitute a pressure receiving surface to generate the separation force.

In the example shown in FIG. 1, an approach controlling surface 24 is formed in the second processing member 20. This approach controlling surface 24 is a plane opposite, in the axial direction, to the separation controlling surface 23 (upper plane in FIG. 1) and, by action of pressure applied to the fluid to be processed, generates force of approaching the second processing member 20 toward the first processing member 10.

Meanwhile, the pressure of the fluid to be processed exerted on the second processing surface 2 and the separation controlling surface 23, i.e., the fluid pressure, is understood as force constituting an opening force in a mechanical seal. The ratio (area ratio A1/A2) of a projected area A1 of the approach controlling surface 24 projected on a virtual plane perpendicular to the direction of approaching and separating the processing surfaces 1 and 2, that is, in the direction of rising and setting of the second processing member 20 (axial direction in FIG. 1), to a total area A2 of the projected area of the second processing surface 2 of the second processing member 20 and the separation controlling surface 23 projected on the virtual plane is called as balance ratio K, which is important for control of the opening force. This opening force can be controlled by the pressure of the fluid to be processed, i.e., the fluid pressure, by changing the balance line, i.e., by changing the area A1 of the approach controlling surface 24.

Sliding surface actual surface pressure P, i.e., the fluid pressure out of the surface-approaching pressures, is calculated according to the following equation:

$$P = P1 \times (K-k) + Ps$$

Here, P1 represents the pressure of a fluid to be processed, i.e., the fluid pressure, K represents the balance ratio, k represents an opening force coefficient, and Ps represents a spring and back pressure.

By controlling this balance line to control the sliding surface actual surface pressure P, the space between the processing surfaces 1 and 2 is formed as a desired minute space, thereby forming a fluid film of the fluid to be processed so as to make the processed substance such as a product fine and to effect uniform processing by reaction.

Meanwhile, the approach controlling surface 24 may have a larger area than the separation controlling surface 23, though this is not shown in the drawing.

The fluid to be processed becomes a forced thin film fluid by the processing surfaces 1 and 2 that keep the minute space therebetween, whereby the fluid is forced to move out from the circular, processing surfaces 1 and 2. However, the first processing member 10 is rotating; and thus, the mixed fluid to be processed does not move linearly from inside the circular, processing surfaces 1 and 2 to outside thereof, but does move spirally from the inside to the outside thereof by a resultant vector acting on the fluid to be processed, the vector being composed of a moving vector toward the radius direction of the circle and a moving vector toward the circumferential direction.

Meanwhile, a rotary shaft 50 is not only limited to be placed vertically, but may also be placed horizontally, or at a slant. This is because the fluid to be processed is processed in a minute space between the processing surfaces 1 and 2 so that the influence of gravity can be substantially eliminated. In addition, this surface-approaching pressure imparting mechanism can function as a buffer mechanism of micro-vibration and rotation alignment by concurrent use of the foregoing floating mechanism with which the second processing member 20 may be held displaceably.

In the first and second processing members 10 and 20, the temperature thereof may be controlled by cooling or heating at least any one of them; in FIG. 1, an embodiment having temperature regulating mechanisms J1 and J2 in the first and second processing members 10 and 20 is shown. Alternatively, the temperature may be regulated by cooling or heating the introducing fluid to be processed. These temperatures may be used to separate the processed substance or may be set so as to generate Benard convection or Marangoni convection in the fluid to be processed between the first and second processing surfaces 1 and 2.

As shown in FIG. 2, in the first processing surface 1 of the first processing member 10, a groove-like depression 13 extended toward an outer side from the central part of the first processing member 10, namely in a radius direction, may be formed. The depression 13 may be, as a plane view, curved or spirally extended on the first processing surface 1 as shown in FIG. 2(B), or, though not shown in the drawing, may be extended straight radially, or bent at a right angle, or jogged; and the concave portion may be continuous, intermittent, or branched. In addition, this depression 13 may be formed also on the second processing surface 2, or on both the first and second processing surfaces 1 and 2. By forming the depression 13 as mentioned above, the micro-pump effect can be obtained so that the fluid to be processed may be sucked into between the first and second processing surfaces 1 and 2.

It is preferable that the base edge of this depression 13 reach the inner periphery of the first processing member 10. The front edge of the depression 13 is extended to the direction of the outer periphery of the first processing surface 1; the depth thereof (cross section area) is made gradually shallower (smaller) from the base edge to the front edge.

Between the front edge of the depression 13 and the outer peripheral of the first processing surface 1 is formed the flat plane 16 not having the depression 13.

When an opening d20 of the second introduction part d2 is arranged in the second processing surface 2, the arrangement is done preferably at a position opposite to the flat surface 16 of the first processing surface 1 arranged at a position opposite thereto.

This opening d20 is arranged preferably in the downstream (outside in this case) of the depression 13 of the first processing surface 1. The opening is arranged especially preferably at a position opposite to the flat surface 16 located nearer to the outer diameter than a position where the direction of flow upon introduction by the micro-pump effect is changed to the direction of a spiral and laminar flow formed between the processing surfaces. Specifically, in FIG. 2(B), a distance n from the outermost side of the depression 13 arranged in the first processing surface 1 in the radial direction is preferably about 0.5 mm or more. Especially in the case of separating microparticles from a fluid, it is preferable that mixing of a plurality of fluids to be processed and separation of the microparticles therefrom be effected under the condition of a laminar flow. Form of the opening d20 may be a circular form as shown in FIG. 2(B) and FIG. 3(B); or a concentric circular ring surrounding the central opening of the processing surface 2 which is a ring-shape disk (this is not shown by drawing). Further, if the opening is in the form of a circular ring, this circular ring opening may be continuous or discontinuous.

This second introduction part d2 may have directionality. For example, as shown in FIG. 3(A), the direction of introduction from the opening d20 of the second processing surface 2 is inclined at a predetermined elevation angle ($\theta 1$) relative to the second processing surface 2. The elevation angle ($\theta 1$) is set at more than 0° and less than 90°, and when the reaction speed is high, the angle ($\theta 1$) is preferably set in the range of 1° to 45°.

In addition, as shown in FIG. 3(B), introduction from the opening d20 of the second processing surface 2 has directionality in a plane along the second processing surface 2. The direction of introduction of this second fluid is in the outward direction departing from the center in a radial component of the processing surface and in the forward direction in a rotation component of the fluid between the rotating processing surfaces. In other words, a predetermined angle ($\theta 2$) exists facing the rotation direction R from a reference line g, which is the line to the outward direction and in the radial direction passing through the opening d20. This angle ($\theta 2$) is also set preferably at more than 0° and less than 90°.

This angle ($\theta 2$) can vary depending on various conditions such as the type of fluid, the reaction speed, viscosity, and the rotation speed of the processing surface. In addition, it is also possible not to give the directionality to the second introduction part d2 at all.

In the embodiment shown in FIG. 1, kinds of the fluid to be processed and numbers of the flow path thereof are set two respectively; but they may be one, or three or more. In the embodiment shown in FIG. 1, the second fluid is introduced into between the processing surfaces 1 and 2 from the introduction part d2; but this introduction part may be arranged in the first processing member 10 or in both. Alternatively, a plurality of introduction parts may be arranged relative to one fluid to be processed. The opening for introduction arranged in each processing member is not particularly restricted in its form, size, and number; and these may be changed as appropriate. The opening for introduction may be arranged just before the first and second processing surfaces 1 and 2 or in the side of further upstream thereof.

Meanwhile, because it is good enough only if the reaction could be effected between the processing surfaces 1 and 2, as opposed to the foregoing method, a method wherein the second fluid is introduced from the first introduction part d1 and a solution containing the first fluid is introduced from the second introduction part d2 may also be used. That is, the expression "first" or "second" for each fluid has a meaning for merely discriminating an $n^{th}$ fluid among a plurality of the fluids present; and therefore, a third or more fluids can also exist.

In the above-mentioned apparatus, a treatment such as separation/precipitation and crystallization is effected while the fluids are being mixed forcibly and uniformly between the processing surfaces 1 and 2 which are disposed in a position they are faced with each other so as to be able to approach to and separate from each other, at least one of which rotates relative to the other, as shown in FIG. 1. Particle diameter and monodispersity of the treated substance to be processed can be controlled by appropriately controlling rotation speed of the processing members 10 and 20, distance between the processing surfaces 1 and 2, concentration of raw materials in the fluids to be processed, kind of solvents in the fluids to be processed, and so forth.

Hereunder, specific embodiments as to the method for producing microparticles having controlled crystallite diameter by using the above-mentioned apparatus will be explained.

In the above-mentioned apparatus, as the fluid to be processed, the raw material fluid containing at least one substance to be separated is mixed with the separating fluid containing at least one substance to separate the substance to be separated in the thin film fluid formed between the processing surfaces 1 and 2 which are disposed in a position they are faced with each other so as to be able to approach to and separate from each other, at least one of which rotates relative to the other, thereby separating the microparticles of the substance to be separated having a crystallite diameter thereof controlled. At this time, the crystallite diameter of the substance to be separated is controlled by changing a specific condition with regard to at least any one of the raw material fluid and the separating fluid that are introduced into between the processing surfaces 1 and 2. Here, the said specific condition shall be at least two conditions selected from the group consisting of: kind of at least any one of at least one substance to be separated contained in the raw material fluid and at least one substance contained in the separating fluid; concentration of at least any one of at least one substance to be separated contained in the raw material fluid and at least one substance contained in the separating fluid; pH of at least any one of the raw material fluid and the separating fluid; introduction temperature of at least any one of the raw material fluid and the separating fluid; and introduction velocity of at least anyone of the raw material fluid and the separating fluid. In addition, the specific condition with regard to at least any one of the raw material fluid and the separating fluid that are introduced into between the processing surfaces 1 and 2 may be at least one condition selected from the group consisting of: pH of at least anyone of the raw material fluid and the separating fluid, introduction temperature of at least any one of the raw material fluid and the separating fluid, and introduction velocity of at least any one of the raw material fluid and the separating fluid.

The reaction to separate the microparticles takes place in the apparatus as shown in FIG. 1 of the present application while the fluids are being mixed forcibly and uniformly between the processing surfaces 1 and 2 which are disposed in a position they are faced with each other so as to be able to approach to and separate from each other, at least one of which rotates relative to the other.

At first, the separating fluid in which at least one substance to separate the substance to be separated is contained is introduced as the first fluid from the first introduction part d1, which is one flow path, into between the processing surfaces 1 and 2 which are disposed in a position they are faced with each other so as to be able to approach to and separate from each other, at least one of which rotates relative to the other, thereby forming between the processing surfaces a first fluid film which is a thin film fluid formed of the first fluid.

Then, the raw material fluid in which at least one substance to be separated is contained is introduced as the second fluid directly into the first fluid film formed between the processing surfaces 1 and 2 from the second introduction part d2 which is another flow path.

By so doing, the first fluid and the second fluid are mixed between the processing surfaces 1 and 2 while the distance therebetween is fixed by pressure balance between the supply pressure of the fluids to be processed and the pressure that is applied between the rotating processing surfaces, thereby effecting the reaction to separate the microparticles of substance to be separated having controlled crystallite diameter.

Meanwhile, because it is good enough only if the reaction could be effected between the processing surfaces 1 and 2, as opposed to the foregoing method, a method wherein the second fluid is introduced from the first introduction part d1 and a solution containing the first fluid is introduced from the second introduction part d2 may also be used. That is, the expression "first" or "second" for each fluid has a meaning for merely discriminating an $n^{th}$ fluid among a plurality of the fluids present; and therefore, a third or more fluids can also exist.

As mentioned before, the processing apparatus may be provided with, in addition to the first introduction part d1 and the second introduction part d2, the third introduction part; and in this case, for example, each of the fluids which contain a later-mentioned pH-controlling agent may be introduced into the processing apparatus as the first fluid, the second fluid, and the third fluid. By so doing, concentration and pressure of each solution can be controlled separately so that the separation reaction and the crystallite diameter of microparticles may be controlled more precisely. Meanwhile, a combination of the fluids to be processed (first to third fluids) that are introduced into each of the introduction parts may be set arbitrarily. The same is applied if the fourth or more introduction parts are arranged; and by so doing, fluids to be introduced into the processing apparatus may be subdivided. In this case, the pH-controlling agent may be contained at least in the third fluid, at least in either one of the first fluid or the second fluid, or neither in the first fluid nor the second fluid.

In addition, temperatures of the fluids to be processed such as the first fluid and the second fluid may be controlled; and temperature difference among the first fluid, the second fluid, and so on (namely, temperature difference among each of the supplied fluids to be processed) may be controlled either. To control temperature and temperature difference of each of the supplied fluids to be processed, a mechanism with which temperature of each of the fluids to be processed is measured (temperature of the fluid before introduction to the processing apparatus, or in more detail, just before introduction into between the processing surfaces 1 and 2) so that each of the fluids to be processed that is introduced into between the processing surfaces 1 and 2 may be heated or cooled may be installed.

Change of the Introduction Velocity:

In the present invention, crystallite diameter of the obtained microparticles of substance to be separated may be controlled by changing the introduction velocity of at least any one of the raw material fluid and the separating fluid to be introduced into between the processing surfaces 1 and 2. There is a merit that the mixing ratio of the substances to separate the substance to be separated to the substance to be separated which is a raw material can be readily controlled by mere changing of the introduction velocity of at least any one of the fluids to be processed, of raw material fluid and the separating fluid; and as a result, the crystallite diameter of microparticles can be readily controlled, so that it became possible to selectively produce microparticles having different targeted crystallite diameters without investigation of complicated treatment conditions that had been required before. In addition, the present invention may be carried out in the way that the introduction velocity of at least any one of the raw material fluid and the separating fluid that are introduced into between the processing surfaces 1 and 2 is combined with at least one condition selected from the group consisting of the specific conditions with regard to at least any one of the raw material fluid and the separating fluid that are introduced into between the processing surfaces 1 and 2; the said at least one condition being other than the introduction velocity of at least any one of the raw material fluid and the separating fluid that are introduced into between the processing surfaces 1 and 2.

The method to change the introduction velocity of at least any one of the fluids to be processed, of the raw material fluid and the separating fluid, to be introduced into between the processing surfaces 1 and 2 is not particularly restricted. The introduction velocity of at least any one of the raw material fluid and the separating fluid to be introduced into between the processing surfaces 1 and 2 may be changed by using the fluid pressure imparting mechanism p of the fluid processing apparatus, or the introduction velocity of at least any one of the raw material fluid and the separating fluid to be introduced into between the processing surfaces 1 and 2 may be changed by using a fluid sending equipment such as a pump. A combined embodiment of the fluid pressure imparting mechanism p and the fluid sending equipment such as a pump may also be used.

Control of pH:

In the present invention, crystallite diameter of the microparticles of substance to be separated can be controlled readily by changing pH of at least any one of the raw material fluid and the separating fluid to be introduced into between the processing surfaces 1 and 2. Specifically, though not particularly restricted, pH may be changed by containing the later-mentioned pH controlling agent in at least any one of the raw material fluid and the separating fluid; or pH may be changed by changing dissolving concentration of the raw material, the substance to be separated, which is contained in the raw material fluid in a solvent, or by changing concentration of the substance to separate the substance to be separated contained in the separating fluid. Alternatively, pH of at least any one of the raw material fluid and the separating fluid may be changed by methods such as the method in which a plurality of the substances to be separated are dissolved in a solvent and the method in which the separating fluid is made to contain a plurality of the substances to separate the substance to be separated. By the pH controlling methods as mentioned above, crystallite diameter of the microparticles can be readily controlled; and thus, microparticles having intended crystallite diameters according to an object may be selectively produced. In addition, the present invention may be carried out in the way that the pH of at least any one of the raw material fluid and the separating fluid that are introduced into between the processing surfaces 1 and 2 is combined with at least one condition selected from the group consisting of the specific conditions with regard to at least any one of the raw material fluid and the separating fluid that are introduced into between the processing surfaces 1 and 2; the said at least one condition being other than the pH of at least any one of the raw material fluid and the separating fluid that are introduced into between the processing surfaces 1 and 2.

Substances for pH Control:

As to the pH control substance to control pH, there is no particular restriction; and illustrative example thereof includes an inorganic or an organic acidic substance such as hydrochloric acid, sulfuric acid, nitric acid, aqua regia, trichloroacetic acid, trifluoroacetic acid, phosphoric acid, citric acid, and ascorbic acid; a basic substance including alkaline hydroxides such as sodium hydroxide and potassium hydroxide, and amines such as triethylamine and dimethylaminoethanol; and salts of the acidic substances and basic substances. The pH controlling agents each may be used singly or as a mixture of two or more of them. By changing the mixing amount of the pH controlling agent into any one of the raw material fluid and the separating fluid, or by changing concentration of any one of the raw material fluid and the separating fluid, pH of at least any one of the raw material fluid and the separating fluid can be changed.

The pH controlling agent may be contained in the raw material fluid, or in the separating fluid, or in the both fluids. Alternatively, the pH controlling agent may be contained in a third fluid that is different from the raw material fluid and the separating fluid.

Range of pH:

In the present invention, pH of any one of the raw material fluid and the separating fluid or both is not particularly restricted; the pH can be appropriately changed in accordance with the kind of the substance to be separated to be used, the crystallite diameter to be targeted, and so forth.

Dispersing Agent and so Forth:

In the present invention, various dispersing agents and surfactants may be used in accordance with the purpose and the necessity. Though not particularly restricted, various commercially available general surfactants and dispersing agents as well as a newly synthesized substance may be used. Illustrative example thereof includes an anionic surfactant, a cationic surfactant, a nonionic surfactant, as well as a dispersing agent such as various polymers. These may be used singly or as a combination of two or more of them.

The surfactants and dispersing agents may be contained in the raw material fluid, in the separating fluid, or in the both fluids. Alternatively, the surfactants and the dispersing agents may be contained in a third fluid that is different from the raw material fluid and the separating fluid.

Temperature:

In the present invention, the temperature during the time of mixing the raw material fluid with the separating fluid is not particularly restricted. The present invention may be carried out at arbitral temperature in accordance with the kind of the substance to be separated that is the starting raw material, the kind of the substance to separate the said substance to be separated, the kind of the substance to be separated that is separated as the targeted substance, the pH as mentioned above, and the like.

In addition, the present invention, the crystallite diameter of obtained microparticles of the substance to be separated may be controlled by changing the introduction temperature of at least any one of the fluids to be processed, i.e., the raw material fluid and the separating fluid that are introduced into between the processing surfaces 1 and 2. The specific method thereof is not particularly restricted; however, as mentioned above, for example, it may be carry out by arranging a mechanism to heat or cool the raw material fluid and the separating fluid that are introduced into between the processing surfaces 1 and 2 in accordance with the respectively measured temperatures of the raw material fluid and the separating fluid (temperatures of the respective fluids introduced into the apparatus, or in more detail, temperatures of these fluids introduced just before into between the processing surfaces 1 and 2). In addition, the present invention may be carried out in the way that the introduction temperature of at least any one of the raw material fluid and the separating fluid that are introduced into between the processing surfaces 1 and 2 is combined with at least one condition selected from the group consisting of the specific conditions with regard to at least any one of the raw material fluid and the separating fluid that are introduced into between the processing surfaces 1 and 2; the said at least one condition being other than the introduction temperature of at least any one of the raw material fluid and the separating fluid that are introduced into between the processing surfaces 1 and 2.

Further, in the present invention, the crystallite diameter of the obtained microparticles of the substance to be processed may be controlled by changing at least two specific conditions selected from the group consisting of: kind of at least any one of at least one substance to be separated contained in the raw material fluid and at least one substance contained in the separating fluid, these fluids being introduced into between the processing surface 1 and 2, and concentration of at least any one of at least one substance to be separated contained in the raw material fluid and at least one substance contained in the separating fluid, these fluids being introduced into between the processing surface 1 and 2, in addition to pH of at least any one of the raw material fluid and the separating fluid that are introduced into between the processing surface 1 and 2, introduction temperature of at least any one of the raw material fluid and the separating fluid that are introduced into between the processing surface 1 and 2, and introduction velocity of at least any one of the raw material fluid and the separating fluid that are introduced into between the processing surface 1 and 2. Upon carrying out the present invention, the conditions may be arbitrarily selected within the degree not deviating from the purpose of the present invention; the said conditions being kind of the substance to be separated that is the starting raw material, kind of the substance to separate the substance to be separated, kind of the substance to be separated that is separated as the targeted substance, and concentration of the respective substances.

EXAMPLES

Hereinafter, the present invention will be explained in more detail by Examples; but the present invention is not limited only to these Examples.

It is to be noted here that the term "from the center" in the following Examples means "from the first introduction part d1" of the processing apparatus shown in FIG. 1; the first fluid means the first fluid to be processed that is introduced through the first introduction part d1 of the processing apparatus as described before; and the second fluid means the second fluid to be processed that is introduced through the second introduction part d2 of the processing apparatus shown in FIG. 1, as described before.

Measurement of pH:

Measurement of pH was made by using a pH meter (Type D-51, manufactured by Horiba Ltd.). Before introducing each of the fluids to be processed into the fluid processing apparatus, pH of each of the fluids to be processed was measured at room temperature.

Observation by Electron Microscope:

Observation of the primary particle diameter and of the crystallite diameter by a transmission electron microscope (TEM) was made by using the transmission electron microscope (TEM) JEM-2100 (manufactured by JEOL Ltd.). Measurement and observation conditions with the acceleration voltage of 200 kV and magnification rate of 400,000 to 800,000 were used; and the average value of the observation at 3 spots was used. Hereinafter, the primary particle diameter confirmed by the TEM observation shall be adopted as the particle diameter.

Example 1

The yttria-stabilized zirconium microparticles were prepared by the following procedure by using the apparatus shown in FIG. 1. A mixed metal salt solution (raw material fluid) with pH of 0.12, comprising 11.8% by weight of nitrate-oxidized zirconium dihydrate and 0.18% by weight of yttrium nitrate dissolved in pure water, was mixed with the aqueous basic solution (separating fluid) with pH of 13.03, obtained by dissolving sodium hydroxide in pure water so as to give the concentration thereof being 1% by weight, in the thin film fluid formed between the processing surfaces 1 and 2, thereby separating the precursor microparticles of the yttria-stabilized zirconia in the thin film fluid.

Example 2

The yttria-stabilized zirconium microparticles were prepared by the following procedure by using the apparatus shown in FIG. 1. A mixed metal salt solution (raw material fluid) with pH of 0.12, comprising 11.8% by weight of nitrate-oxidized zirconium dihydrate and 0.18% by weight of yttrium nitrate dissolved in pure water, was mixed with the aqueous basic solution (separating fluid) with pH of 11.33, obtained by dissolving aqueous ammonia containing ammonia 28% in pure water so as to give the concentration thereof being ammonia 1% by weight, in the thin film fluid formed between the processing surfaces 1 and 2, thereby separating the precursor microparticles of the yttria-stabilized zirconia in the thin film fluid.

Example 3

The yttria-stabilized zirconium microparticles were prepared by the following procedure by using the apparatus shown in FIG. 1. A mixed metal salt solution (raw material fluid) with pH of 0.12, comprising 11.8% by weight of nitrate-oxidized zirconium dihydrate and 0.18% by weight of yttrium nitrate dissolved in pure water, was mixed with the aqueous basic solution (separating fluid) with pH of 8.46, obtained by dissolving potassium hydrogen carbonate in pure water so as to give the concentration thereof being 1% by weight, in the thin film fluid formed between the processing surfaces 1 and 2, thereby separating the precursor microparticles of the yttria-stabilized zirconia in the thin film fluid.

While the aqueous basic solution (separating fluid) was introduced as the first fluid from the center with the supply pressure of 0.50 MPaG, the rotation number of 1700 rpm, the supply temperature of 25° C., and the introduction velocity of 200 mL/minute, the mixed metal salt solution (raw material fluid) with the temperature of 25° C. was introduced as the second fluid into between the processing surfaces 1 and 2 with the introduction velocity of 10 mL/minute, whereby mixing the first fluid and the second fluid in the thin film fluid. The respective supply temperatures of the first fluid and the second fluid were measured just before the first fluid and the second fluid were introduced into the processing apparatus (in more detail, just before introduction into between the processing surfaces 1 and 2). The dispersion solution of the precursor microparticles of yttria-stabilized zirconia discharged from the processing surfaces is subjected to centrifugal separation with 10,000×g for 5 minutes to spin down the precursor microparticles of yttria-stabilized zirconia; and then, the supernatant solution thereof was removed. The precursor microparticles were washed by pure water for 3 times, dried at 60° C. and the pressure of −0.1 MPa by using a vacuum dryer, and then burnt at 1000° C. for 4 hours. As the result of the XRD measurement after burning, it was confirmed that the yttria-stabilized zirconia microparticles without impurities could be prepared. The particle diameter and the crystallite diameter of the obtained yttria-stabilized zirconia microparticles were confirmed by the TEM observation.

Figure 4:
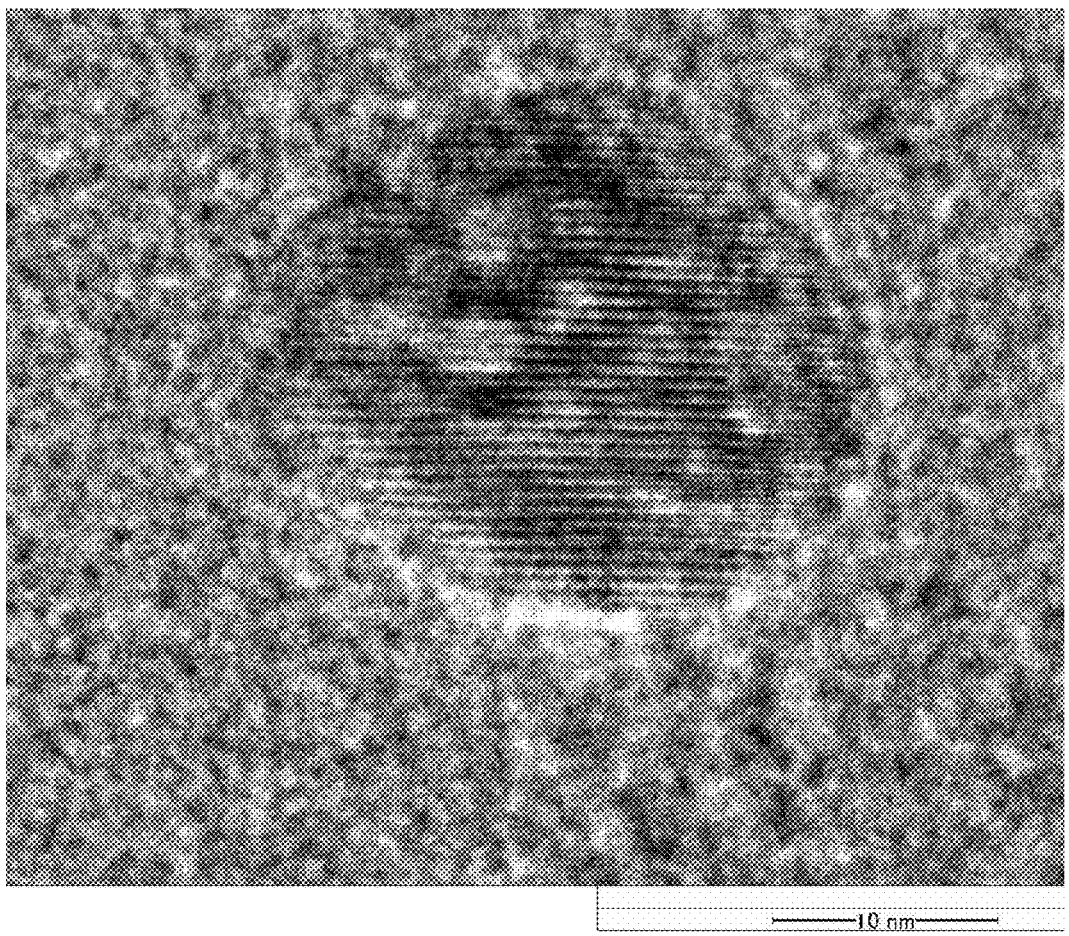
FIG. 4 is a TEM picture of yttria-stabilized zirconium microparticles produced in Example 1 of the present invention (magnification of 500,000, horizontal width of field 52 nm).
Figure 5:
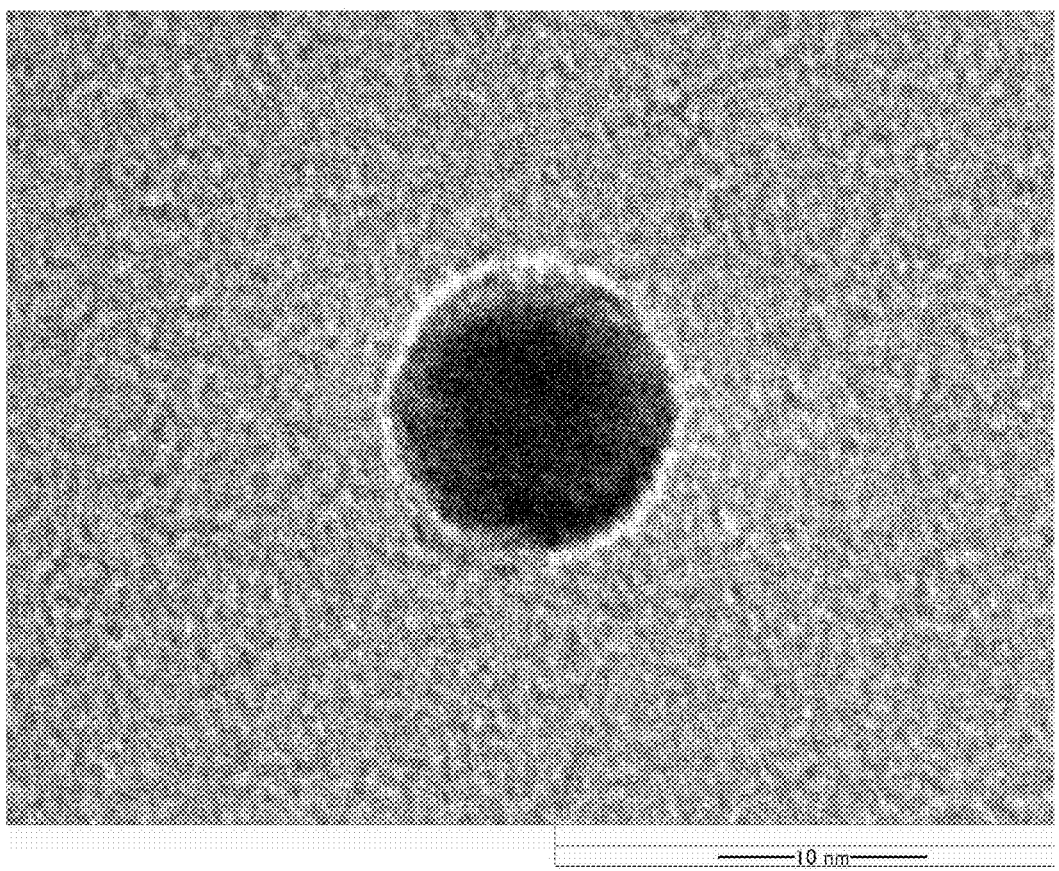
FIG. 5 is a TEM picture of yttria-stabilized zirconium microparticles produced in Example 2 of the present invention (magnification of 500,000, horizontal width of field 52 nm).
Figure 6:
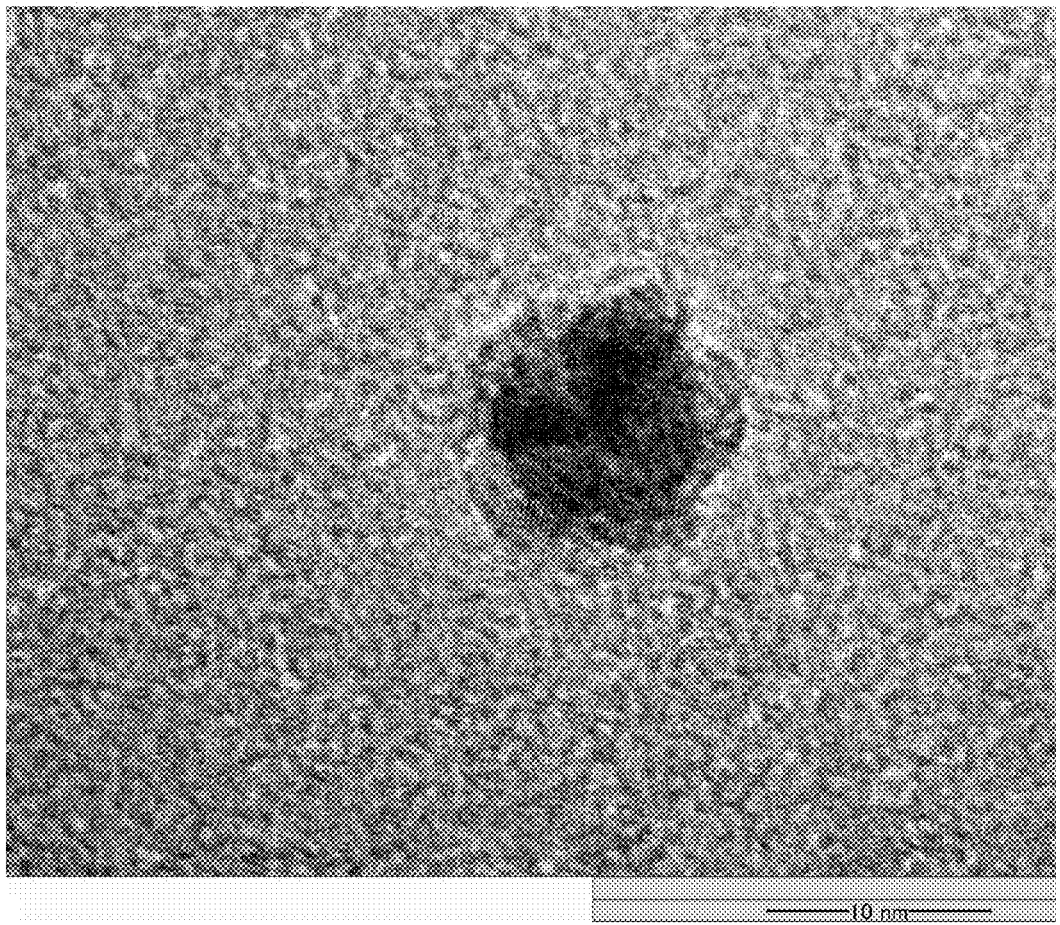
FIG. 6 is a TEM picture of yttria-stabilized zirconium microparticles produced in Example 3 of the present invention (magnification of 500,000, horizontal width of field 52 nm).

The treatment conditions, and the particle diameter and the crystallite diameter of the obtained yttria-stabilized zirconia microparticles are shown in Table 1. In FIG. 4 to FIG. 6, the TEM pictures of the yttria-stabilized zirconia microparticles obtained in Example 1 to Example 3 are shown.

TABLE 1

| | First fluid | | | Second fluid | | | |
|---|---|---|---|---|---|---|---|
| Example | Kind | pH | Introduction velocity (mL/minute) | Kind | Introduction velocity (mL/minute) | Particle diameter (nm) | Crystallite diameter (nm) |
| 1 | 1% by weight aqueous sodium hydroxide | 13.03 | 200 | 11.8% by weight nitrate-oxidized zirconium dihydrate/0.18% by weight aqueous yttrium nitrate | 10 | 20 | 20 |
| 2 | 1% by weight aqueous ammonia | 11.33 | | | 10 | 10 | 10 |
| 3 | 1% by weight aqueous potassium hydrogen carbonate | 8.46 | | | 10 | 10 | 3 |

From FIG. 4 to FIG. 6 and Table 1, it was confirmed that, by changing the kind of the basic substance dissolved in pure water to obtain the aqueous basic solution as well as pH of the aqueous basic solution, the crystallite diameter of the obtained yttria-stabilized zirconia microparticles could be controlled.

Specifically, in Example 1 and Example 2, the kind of the basic substance contained in the first fluid was changed, and the pH of the fluid was made higher; and as a result of it, the yttria-stabilized zirconia microparticles having a larger crystallite diameter could be obtained. Further, in Example 1 and Example 2, the kind of the basic substance contained in the first fluid was changed, and the pH of the fluid was made higher; and as a result of it, the yttria-stabilized zirconia microparticles having a larger particle diameter could be obtained. From the above results, it was confirmed that, in Example 1 and Example 2, by changing the kind of the basic substance contained in the first fluid, and further by making the pH of the fluid higher, both the particle diameter and the crystallite diameter of the yttria-stabilized zirconia microparticles could be changed.

In addition, in Example 3, the yttria-stabilized zirconia microparticles having different particle diameter and crystallite diameter could be obtained, unlike the cases of Example 1 and Example 2.

Example 4

The copper microparticles were prepared by the following procedure by using the apparatus shown in FIG. 1. A metal salt solution (raw material fluid) with pH of 2.35 obtained by dissolving copper chloride (anhydrous) in ethylene glycol so as to give the concentration thereof being 2% by weight was mixed with the reducing agent solution (separating fluid) with pH of 10.55 obtained by dissolving hydrazine monohydrate in ethylene glycol so as to give the concentration thereof being 2% by weight, in the thin film fluid formed between the processing surfaces 1 and 2, thereby separating the copper microparticles in the thin film fluid.

While the reducing agent solution (separating fluid) was introduced as the first fluid from the center with the supply pressure of 0.50 MPaG, the rotation number of 1700 rpm, the supply temperature of 100° C., and the introduction velocity of 300 mL/minute, the metal salt solution (raw material fluid) with the temperature of 25° C. was introduced as the second fluid into between the processing surfaces 1 and 2 with the introduction velocity of 5 mL/minute, whereby mixing the first fluid and the second fluid in the thin film fluid. The respective supply temperatures of the first fluid and the second fluid were measured just before the first fluid and the second fluid were introduced into the processing apparatus (in more detail, just before introduction into between the processing surfaces 1 and 2).

Example 5

The copper microparticles were prepared by the following procedure by using the apparatus shown in FIG. 1. A metal salt solution (raw material fluid) with pH of 2.11 obtained by dissolving copper chloride (anhydrous) in ethylene glycol so as to give the concentration thereof being 6% by weight was mixed with the reducing agent solution (separating fluid) with pH of 10.34 obtained by dissolving hydrazine monohydrate in ethylene glycol so as to give the concentration thereof being 1% by weight, in the thin film fluid formed between the processing surfaces 1 and 2, thereby separating the copper microparticles in the thin film fluid.

While the reducing agent solution (separating fluid) was introduced as the first fluid from the center with the supply pressure of 0.50 MPaG, the rotation number of 1700 rpm, the supply temperature of 100° C., and the introduction velocity of 300 mL/minute, the metal salt solution (raw material fluid) with the temperature of 25° C. was introduced as the second fluid into between the processing surfaces 1 and 2 with the introduction velocity of 5 mL/minute, whereby mixing the first fluid and the second fluid in the thin film fluid. The respective supply temperatures of the first fluid and the second fluid were measured just before the first fluid and the second fluid were introduced into the processing apparatus (in more detail, just before introduction into between the processing surfaces 1 and 2).

Example 6

The copper microparticles were prepared by the following procedure by using the apparatus shown in FIG. 1. A metal salt solution (raw material fluid) with pH of 2.08 obtained by dissolving copper nitrate trihydrate in ethylene glycol so as to give the concentration thereof being 10% by weight was mixed with the reducing agent solution (separating fluid) with pH of 10.55 obtained by dissolving hydrazine monohydrate in ethylene glycol so as to give the concentration thereof being 2% by weight, in the thin film fluid formed between the processing surfaces 1 and 2, thereby separating the copper microparticles in the thin film fluid.

While the reducing agent solution (separating fluid) was introduced as the first fluid from the center with the supply pressure of 0.50 MPaG, the rotation number of 1700 rpm, the supply temperature of 100° C., and the introduction velocity of 300 mL/minute, the metal salt solution (raw material fluid) with the temperature of 25° C. was introduced as the second fluid into between the processing surfaces 1 and 2 with the introduction velocity of 5 mL/minute, whereby mixing the first fluid and the second fluid in the thin film fluid. The respective supply temperatures of the first fluid and the second fluid were measured just before the first fluid and the second fluid were introduced into the processing apparatus (in more detail, just before introduction into between the processing surfaces 1 and 2).

Example 7

The copper microparticles were prepared by the following procedure by using the apparatus shown in FIG. 1. A metal salt solution (raw material fluid) with pH of 2.11 obtained by dissolving copper chloride (anhydrous) in ethylene glycol so as to give the concentration thereof being 6% by weight was mixed with the reducing agent solution (separating fluid) with pH of 10.34 obtained by dissolving hydrazine monohydrate in ethylene glycol so as to give the concentration thereof being 1% by weight, in the thin film fluid formed between the processing surfaces 1 and 2, thereby separating the copper microparticles in the thin film fluid.

While the reducing agent solution (separating fluid) was introduced as the first fluid from the center with the supply pressure of 0.50 MPaG, the rotation number of 1700 rpm, the supply temperature of 130° C., and the introduction velocity of 300 mL/minute, the metal salt solution (raw material fluid) with the temperature of 25° C. was introduced as the second fluid into between the processing surfaces 1 and 2 with the introduction velocity of 5 mL/minute, whereby mixing the first fluid and the second fluid in the thin film fluid. The respective supply temperatures of the first fluid and the second fluid were introduced into the processing apparatus (in more detail, just before introduction into between the processing surfaces 1 and 2).

Example 8

The copper microparticles were prepared by the following procedure by using the apparatus shown in FIG. 1. A metal salt solution (raw material fluid) with pH of 1.49 obtained by dissolving benzotriazole in ethylene glycol so as to give the concentration thereof being 6% by weight was mixed with the reducing agent solution (separating fluid) with pH of 10.34 obtained by dissolving hydrazine monohydrate in ethylene glycol so as to give the concentration thereof being 1% by weight, in the thin film fluid formed between the processing surfaces 1 and 2, thereby separating the copper microparticles in the thin film fluid.

While the reducing agent solution (separating fluid) was introduced as the first fluid from the center with the supply pressure of 0.50 MPaG, the rotation number of 1700 rpm, the supply temperature of 100° C., and the introduction velocity of 300 mL/minute, the metal salt solution (raw material fluid) with the temperature of 25° C. was introduced as the second fluid into between the processing surfaces 1 and 2 with the introduction velocity of 5 mL/minute, whereby mixing the first fluid and the second fluid in the thin film fluid. The respective supply temperatures of the first fluid and the second fluid were measured just before the first fluid and the second fluid were introduced into the processing apparatus (in more detail, just before introduction into between the processing surfaces 1 and 2).

Example 9

The copper microparticles were prepared by the following procedure by using the apparatus shown in FIG. 1. A metal salt solution (raw material fluid) with pH of 2.11 obtained by dissolving copper chloride (anhydrous) in ethylene glycol so as to give the concentration thereof being 6% by weight was mixed with the reducing agent solution (separating fluid) with pH of 10.34 obtained by dissolving hydrazine monohydrate in ethylene glycol so as to give the concentration thereof being 1% by weight, in the thin film fluid formed between the processing surfaces 1 and 2, thereby separating the copper microparticles in the thin film fluid.

While the reducing agent solution (separating fluid) was introduced as the first fluid from the center with the supply pressure of 0.50 MPaG, the rotation number of 1700 rpm, the supply temperature of 100° C., and the introduction velocity of 100 mL/minute, the metal salt solution (raw material fluid) with the temperature of 25° C. was introduced as the second fluid into between the processing surfaces 1 and 2 with the introduction velocity of 5 mL/minute, whereby mixing the first fluid and the second fluid in the thin film fluid. The respective supply temperatures of the first fluid and the second fluid were measured just before the first fluid and the second fluid were introduced into the processing apparatus (in more detail, just before introduction into between the processing surfaces 1 and 2).

The dispersion solution of the copper microparticles were discharged from the processing surfaces by mixing the first fluid with the second fluid that were introduced into between the processing surfaces 1 and 2 in the thin film fluid. The dispersion solution of the discharged copper microparticles is subjected to centrifugal separation with 10,000×g for 5 minutes to spin down the copper microparticles; and then, the supernatant solution thereof was removed. The copper microparticles were washed by methanol for 3 times, dried at 50° C. and the pressure of −0.1 MPa by using a vacuum dryer. As the result of the XRD measurement of the dried copper microparticles, it was confirmed that the copper could be prepared. The particle diameter and the crystallite diameter of the copper microparticles were confirmed by the TEM observation.

Figure 7:
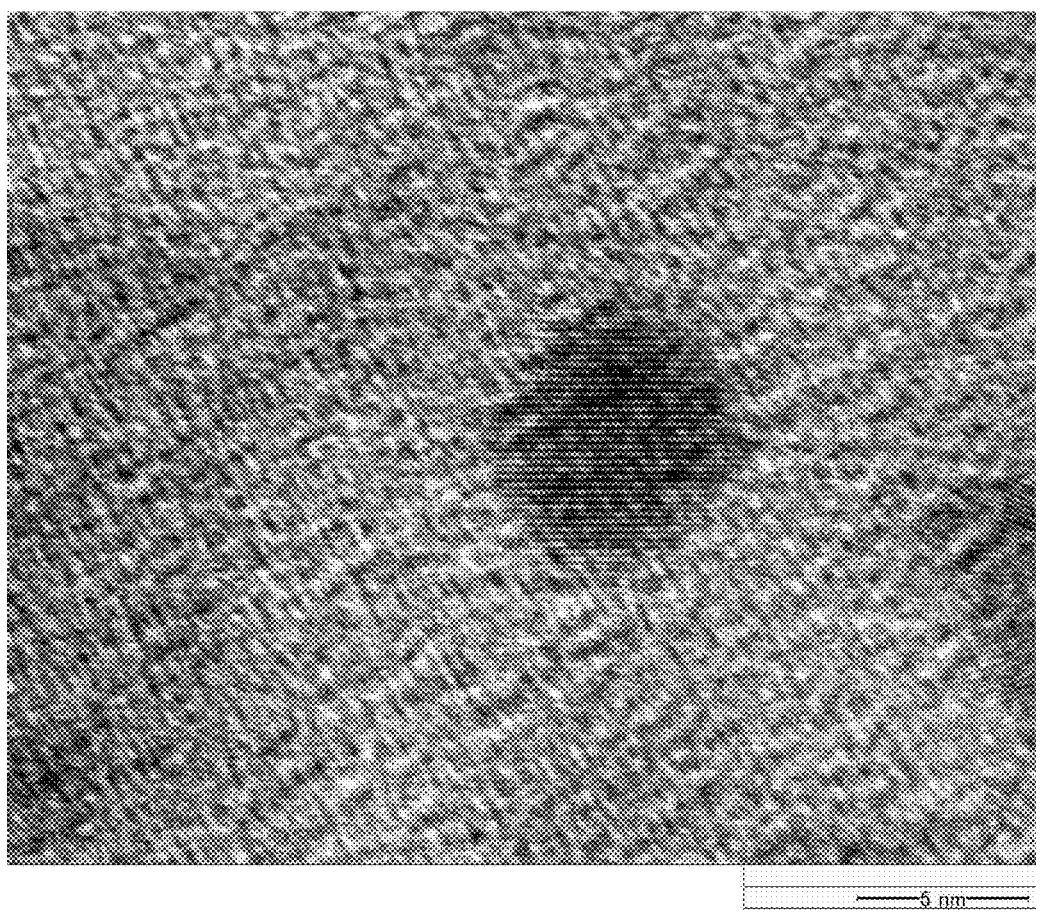
FIG. 7 is a TEM picture of copper microparticles produced in Example 4 of the present invention (magnification of 800,000, horizontal width of field 33.2 nm).
Figure 8:
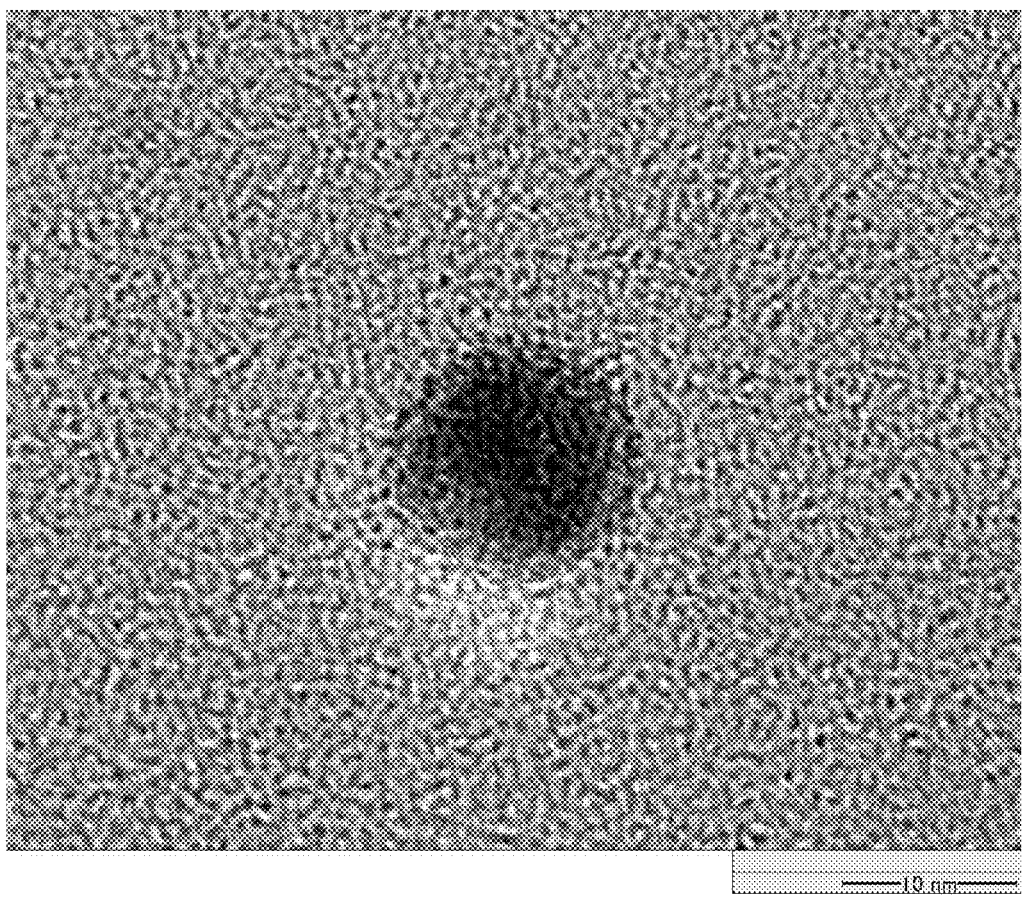
FIG. 8 is a TEM picture of copper microparticles produced in Example 5 of the present invention (magnification of 400,000, horizontal width of field 64.4 nm).
Figure 9:
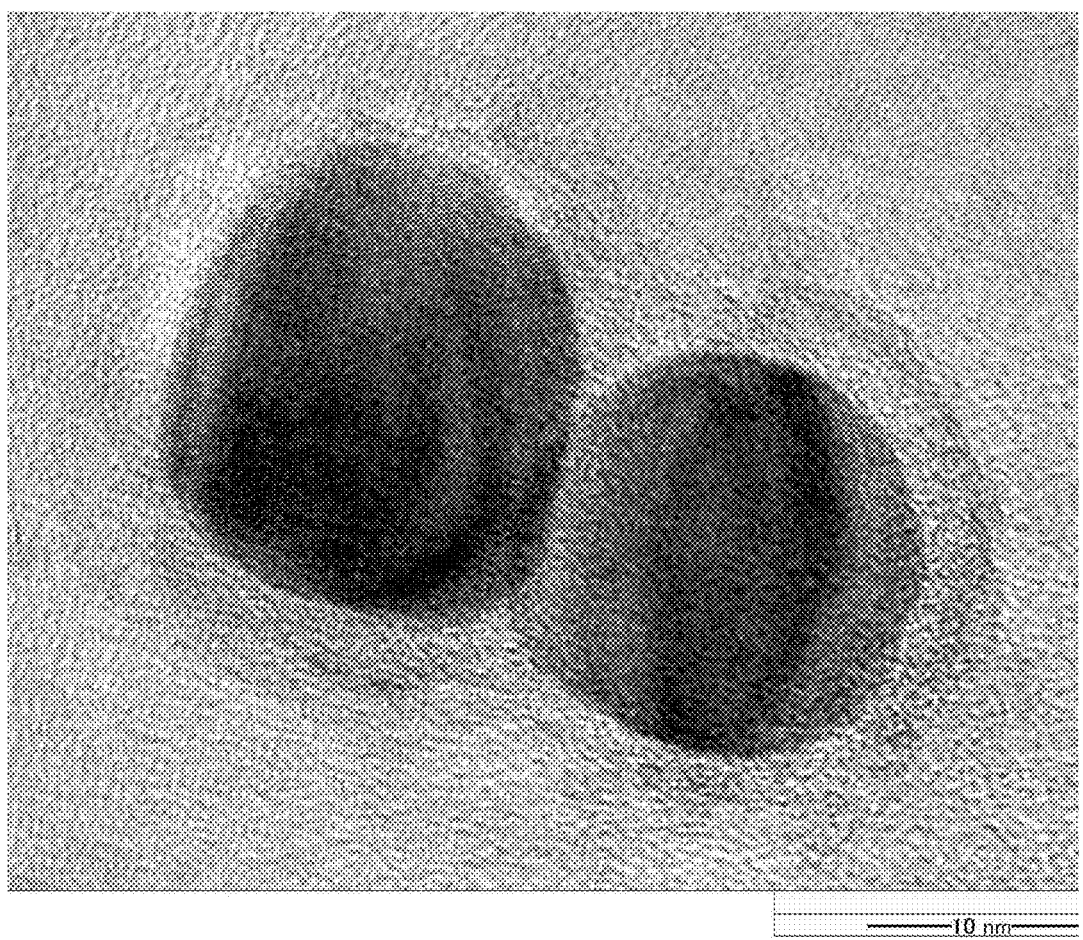
FIG. 9 is a TEM picture of copper microparticles produced in Example 6 of the present invention (magnification of 500,000, horizontal width of field 52 nm).

The treatment conditions, and the particle diameter and the crystallite diameter of the obtained copper microparticles are shown in Table 2. In FIG. 7 to FIG. 9, the TEM pictures of the copper microparticles obtained in Example 4 to Example 6 are shown.

TABLE 2

| | | First fluid | | | | Second fluid | | | | |
|---|---|---|---|---|---|---|---|---|---|---|
| Example | Kind | Introduction velocity (mL/minute) | Temperature (° C.) | pH | Kind | Introduction velocity (mL/minute) | Temperature (° C.) | pH | Particle diameter (nm) | Crystallite diameter (nm) |
| 4 | 2% by weight hydrazine monohydrate/ ethylene glycol solution | 300 | 100 | 10.55 | 2% by weight copper chloride/ ethylene glycol solution | 5 | 25 | 2.35 | 5 | 5 |
| 5 | 1% by weight hydrazine monohydrate/ ethylene glycol solution | 300 | 100 | 10.34 | 6% by weight copper chloride/ ethylene glycol solution | 5 | 25 | 2.11 | 10 | 10 |
| 6 | 2% by weight hydrazine monohydrate/ ethylene glycol solution | 300 | 100 | 10.55 | 10% by weight copper nitrate trihydrate/ ethylene glycol solution | 5 | 25 | 2.08 | 20 | 20 |
| 7 | 1% by weight hydrazine monohydrate/ ethylene | 300 | 130 | 10.34 | 6% by weight copper chloride/ ethylene | 5 | 25 | 2.11 | 30 | 30 |

TABLE 2-continued

| | First fluid | | | | Second fluid | | | | Particle diameter (nm) | Crystallite diameter (nm) |
|---|---|---|---|---|---|---|---|---|---|---|
| Example | Kind | Introduction velocity (mL/minute) | Temperature (° C.) | pH | Kind | Introduction velocity (mL/minute) | Temperature (° C.) | pH | | |
| | glycol solution | | | | glycol solution | | | | | |
| 8 | 1% by weight hydrazine monohydrate/ ethylene glycol solution | 300 | 100 | 10.34 | 6% by weight copper chloride/ 0.015% by weight benzotriazole/ ethylene glycol solution | 5 | 25 | 1.49 | 5 | 5 |
| 9 | 1% by weight hydrazine monohydrate/ ethylene glycol solution | 100 | 100 | 10.34 | 6% by weight copper chloride/ ethylene glycol solution | 5 | 25 | 2.11 | 10 | 5 |

From FIG. 7 to FIG. 9 and Table 2, it was confirmed that by changing the specific conditions, the crystallite diameter of the obtained copper microparticles could be controlled. For example, in Example 4 and Example 5, when the concentration of the reducing agent in the first fluid (separating fluid) was decreased and the pH thereof was lowered while the concentration of the metal salt in the second fluid (raw material fluid) was increased and the pH thereof was lowered, the particle diameter and the crystallite diameter of the copper microparticles became larger. In Example 4 and Example 6, when the kind of the metal salt and the concentration of the metal salt in the second fluid were changed and the pH thereof was lowered, the particle diameter and the crystallite diameter of the copper microparticles became larger. In Example 4 and Example 7, when the concentration of the reducing agent in the first fluid was decreased and the pH thereof was lowered while the concentration of the metal salt in the second fluid was increased and the pH thereof was lowered, and further the introduction temperature of the first fluid was raised, the particle diameter and the crystallite diameter of the copper microparticles became larger. In Example 7 and Example 8, when benzotriazole was added to the metal salt solution in the second fluid and the pH thereof was lowered, and further the introduction temperature of the first fluid was lowered, the particle diameter and the crystallite diameter of the copper microparticles became smaller. In Example 7 and Example 9, when the introduction velocity and the introduction temperature of the first fluid were lowered, the particle diameter and the crystallite diameter of the copper microparticles became smaller. In Example 5 and Example 6, when the concentration of the reducing agent of the first fluid was increased and the pH thereof was made higher while the kind and the concentration of the metal salt in the second fluid were changed, the particle diameter and the crystallite diameter of the copper microparticles became larger. In Example 6 and Example 7, when the kind and the concentration of the metal salt in the second fluid were changed, and further the concentration of the reducing agent in the first fluid was decreased and the pH thereof was lowered while the introduction temperature thereof was made higher, the particle diameter and the crystallite diameter of the copper microparticles became larger. In Example 6 and Example 8, when the kind and the concentration of the metal salt in the second fluid were changed while benzotriazole was added to the metal salt solution and the pH thereof was lowered, and further the concentration of the reducing agent in the first fluid was lowered and the pH thereof was lowered, the particle diameter and the crystallite diameter of the copper microparticles became smaller. In Example 6 and Example 9, when the kind and the concentration of the metal salt in the second fluid were changed, and further the concentration of the reducing agent in the first fluid and the introduction velocity thereof were made lower, the particle diameter and the crystallite diameter of the copper microparticles became smaller. From the above results, it was confirmed that when at least two conditions with regard to at least any one of the raw material fluid and the separating fluid that are introduced into between the processing surfaces 1 and 2 were changed, the crystallite diameter of the copper microparticles could be controlled; the said two conditions being selected from the group consisting of: kind of the substance to be separated contained in the raw material fluid and/or of the substance contained in the separating fluid, concentration of the substance to be separated contained in the raw material fluid and/or of the substance contained in the separating fluid, pH of the raw material fluid and/or of the separating fluid, introduction temperature of the raw material fluid and/or of the separating fluid, and introduction velocity of the raw material fluid and/or of the separating fluid. In addition, it was confirmed that, in most of the Examples shown above, when the specific conditions mentioned above were changed, both the particle diameter and the crystallite diameter of the copper microparticles could be changed.

Furthermore, it was confirmed that the crystallite diameter of the copper microparticles could be changed, by changing the introduction temperature of the first fluid in Example 5 and Example 7, by changing the pH of the second fluid in Example 5 and Example 8, and by changing the introduction velocity of the first fluid in Example 5 and Example 9. From these results, it was confirmed that, in Example 5 and Examples 7 to Example 9, when at least one specific condition with regard to at least any one of the raw material fluid and the separating fluid that are introduced into between the processing surfaces 1 and 2 was changed, the crystallite diameter of the copper microparticles could be controlled; the said one specific condition being selected from the group consisting of: pH of the raw material fluid and/or of the separating fluid, introduction temperature of the raw material fluid and/or of the separating fluid, and introduction velocity of the raw material fluid and/or of the separating fluid. In addition, it was confirmed that, in Example 5 and Example 7, and in Example 5 and Example 8, when the foregoing specific conditions were changed, both the particle diameter and the crystallite diameter of the copper microparticles could be changed; and in Example 5 and Example 9, when the foregoing specific condition was changed, only the crystallite diameter of the copper microparticles could be changed without changing the particle diameter of the copper microparticles.

Furthermore, unlike the cases of Example 4 to Example 8, in Example 9, the copper microparticles having different particle diameter and crystallite diameter were obtained.

1 first processing surface
2 second processing surface
10 first processing member
11 first holder
20 second processing member
21 second holder
d1 first introduction part
d2 second introduction part
d20 opening

The invention claimed is:

1. A method for producing a microparticle, comprising the steps of:
preparing at least two fluids to be processed, including a first fluid and a second fluid, the first fluid being a raw material fluid containing at least one substance to be separated, and the second fluid being a separating fluid containing at least one substance to separate the substance to be separated; introducing the at least two fluids into a processing device, the processing device comprising at least two processing surfaces facing each other, the at least two processing surfaces being operable to approach to and separate from each other, at least one of the at least two processing surfaces rotating relative to the other;
mixing the at least two fluids in a space formed between the at least two processing surfaces, thereby forming a thin film fluid between the at least two processing surfaces;
separating the substance to be separated so as to obtain a desired crystallite diameter of the separated substance by changing specific conditions with regard to at least any one of the raw material fluid and the separating fluid that are introduced into between the at least two processing surfaces; and obtaining the separated substance after the step of separating, wherein said specific conditions are:
kind of at least any one of said at least one substance to be separated contained in the raw material fluid and said at least one substance contained in the separating fluid, and pH of at least any one of the raw material fluid and the separating fluid, and wherein only the crystallite diameter of the separated substance is changed without changing a particle diameter of the separated substance compared to a substance that has been separated without changing said specific condition.

2. A method for producing a microparticle, comprising the steps of:
preparing at least two fluids to be processed, including a first fluid and a second fluid, the first fluid being a raw material fluid containing at least one substance to be separated, and the second fluid being a separating fluid containing at least one substance to separate the substance to be separated;
introducing the at least two fluids into a processing device, the processing device comprising at least two processing surfaces facing each other, the at least two processing surfaces being operable to approach to and separate from each other, at least one of the at least two processing surfaces rotating relative to the other;
mixing the at least two fluids in a space formed between the at least two processing surfaces, thereby forming a thin film fluid between the at least two processing surfaces; and
separating the substance to be separated so as to obtain a desired crystallite diameter of the separated substance by changing a specific condition with regard to at least any one of the raw material fluid and the separating fluid that are introduced into between the at least two processing surfaces; and obtaining the separated substance after the step of separating, wherein said specific condition is introduction velocity of at least any one of the raw material fluid and the separating fluid, and wherein only the crystallite diameter of the separated substance is changed without changing a particle diameter of the separated substance; compared to a substance that has been separated without changing said specific condition.

* * * * *